United States Patent [19]

Kawamura et al.

[11] Patent Number: 5,237,661
[45] Date of Patent: Aug. 17, 1993

[54] BUFFER MANAGEMENT METHOD AND SYSTEM THEREFOR USING AN I/O BUFFER ON MAIN MEMORY AND UTILIZING VIRTUAL MEMORY AND PAGE FIXING

[75] Inventors: Nobuo Kawamura, Machida; Masashi Tsuchida, Kawasaki, both of Japan

[73] Assignee: Hitachi, Ltd., Tokyo, Japan

[21] Appl. No.: 530,026

[22] Filed: May 29, 1990

[30] Foreign Application Priority Data

May 29, 1989 [JP] Japan ............................ 1-134887
Feb. 23, 1990 [JP] Japan ............................ 2-44046

[51] Int. Cl.⁵ .................... G06F 13/00; G06F 12/00
[52] U.S. Cl. .......................... 395/250; 395/275; 395/600; 395/425; 364/DIG. 1; 364/232.1; 364/239.7; 364/254.3; 364/256.3; 364/282.1
[58] Field of Search ............. 364/DIG. 1; 395/425, 395/275, 600, 250

[56] References Cited

U.S. PATENT DOCUMENTS 4,569,034  2/1986  Findley et al. ............... 364/900
5,043,871  8/1991  Nishigaki et al. ............. 364/200

FOREIGN PATENT DOCUMENTS 169983  3/1982  Japan .

OTHER PUBLICATIONS

Hong-Tai Chou, et al., "An Evaluation of Buffer Management Strategies for Relational Database Systems", 11th International Conference (Proceedings of VLDB 85, Stockholm), pp. 127-141. (Provided in English).

Primary Examiner—Lawrence E. Anderson
Attorney, Agent, or Firm—Fay, Sharpe, Beall, Fagan, Minnich & McKee

[57] ABSTRACT

In a computer system including a main memory and an expanded memory for expanding said main memory logically, a program operating on a virtual memory space, which is managed by the virtual memory management of an operating system, for managing the input/output of the data on an external storage device by using an I/O buffer has a function to manage the I/O buffer secured on the expanded memory, so that the I/O processing for the external storage memory may be reduced by either saving the data, if necessary, of the I/O buffer on the virtual space into the I/O buffer on the expanded memory or restoring the same to the I/O buffer on the virtual space, whereby the I/O buffers can be efficiently utilized.

3 Claims, 34 Drawing Sheets

FIG. 8(a)

LOCALITY SET MANAGEMENT TABLE — 61

| | |
|---|---|
| ID FOR RETRIEVAL | 610 |
| LOCALITY SET ID | 611 |
| LOCALITY SET SIZE | 612 |
| ASSIGNED PAGE NUMBER IN THE LOCALITY SET | 613 |
| FIRST BUFFER ADDRESS | 614 |
| LAST BUFFER ADDRESS | 615 |
| EXPANDED I/O BUFFER FIRST ADDRESS | 616 |
| REPLACEMENT ALGORITHM | 617 |
| BLOCK I/O REQUEST SPECIFICATION INFORMATION | 618 |
| RELATION INFORMATION | 619 |

FIG. 8(b)

PAGE MANAGEMENT TABLE — 65

| | |
|---|---|
| BUFFER ATTRIBUTE INFORMATION | 650 |
| BUFFER NUMBER | 651 |
| FORWARD POINTER FOR THE PAGE MANAGEMENT TABLE | 652 |
| BACKWARD POINTER FOR THE PAGE MANAGEMENT TABLE | 653 |
| HASH CHAIN FORWARD POINTER | 654 |
| HASH CHAIN BACKWARD POINTER | 655 |
| PAGE NUMBER | 656 |
| OUTPUT REQUEST FLAG | 657 |
| PAGE FIX FLAG | 658 |

249a ~ 249c : UNSHARED I/O BUFFER

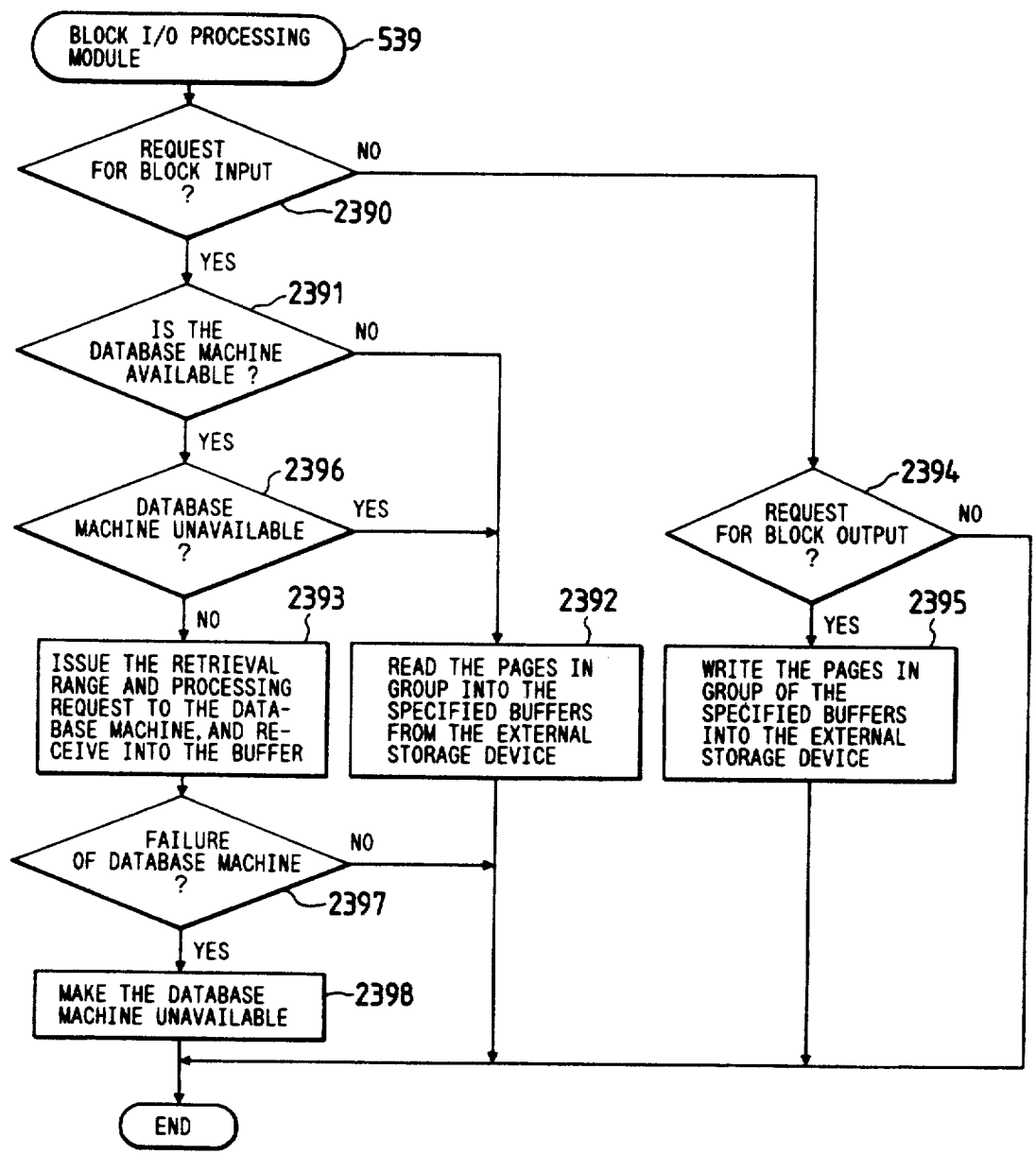

BUFFER MANAGEMENT METHOD AND SYSTEM THEREFOR USING AN I/O BUFFER ON MAIN MEMORY AND UTILIZING VIRTUAL MEMORY AND PAGE FIXING

BACKGROUND OF THE INVENTION

1. Field of the Invention

The present invention relates to a buffer management method making use of database reference characteristics in response to a database query request and, more particularly, to a buffer management method and system of a program having a function to manage the data input/output of an external storage device operating on a virtual memory system, to execute the data input/output efficiently by making use of a main memory and an expanded memory.

2. Description of the Prior Art

In the database management system, a data input/output management method for the database stored in the external memory is generally exemplified by the buffer management function using an input/output buffer securing the data on the main memory.

In the prior art, this input/output buffer management method is chained by the LRU (i.e., Least Recently Used) method or the like. According to this method, however, it is necessary and takes a long time to search the whole chain of the I/O buffer serially in case it is to be decided whether or not the data page newly required exists in the I/O buffer.

In this connection, the buffer searching time can be minimized by using the hashing method, as disclosed in Japanese Patent Laid-Open No. 57-169983, for example.

In the relational database management system of the aforementioned database management system, on the other hand, the database is constructed of a relation which is observed in a two-dimensional expression from the user and which is composed of a plurality of tuples (or records). The aforementioned relation is stored in a plurality of data pages having an I/O unit of the database management system, i.e., a physically fixed length. In the relational database management system, generally speaking, the data are stored in the external memory in random locations having no relation to the expression so that the data in the external storage device has to be efficiently transferred to the main memory. In the database processing, moreover, the I/O number is increased if the aforementioned LRU method is used as the management of the I/O buffer, in case the processings of the sequentially accessing type and the randomly accessing type are mixed. More specifically, in case the data are to be sequentially accessed to, a block inputting (i.e., an inputting of plural pages) is customary as the data input from the database. In case, on the other hand, all the data in the relation are updated, the block outputting (i.e., the outputting of plural pages) is more efficient than the inputting/outputting at the unit of one page, as is well known in the art. In the database system of the prior art, however, it is not practiced yet to manage the inputting/outputting at the unit of one page and plural pages for the database in a mixed manner in one I/O buffer pool.

In the relational database management system thus far described, the user need not determine the accessing procedures to the database, because the queries inputted are analysed to generate the internal processing procedures, so that the access characteristics to the database can be explicitly grasped in the database management system.

The I/O buffer management method making use of the aforementioned access characteristics is exemplified in the prior art by the buffer management method based upon the QLSM (i.e., Query Locality Set Model) method. According to this method, the shared buffer is divided for each query request to execute the management in accordance with the replacement algorithm matching the access request to said query.

In the buffer management method based on this QLSM method, when the internal processing procedures are determined by the optimizing processing module for determining the access method to the database by analysing the query, the buffer of a proper size (which will be called the "locality set size") is divided into divided buffers (which will be called the "locality set") so that they may be managed by the replacement algorithm matching the page reference characteristics to the database of the query.

Incidentally, the buffer management method based on the aforementioned QLSM should be referred to the description of the 11-th International Conference on VLDB "An Evaluation of Buffer Management Strategies for Relational Database Systems" by Hong-Tai Chou et al.

Next, the aforementioned database management system operates on a virtual space according to the virtual memory method or the memory management method of the operating system. In short, the I/O buffer of the database management system is secured on the virtual memory space so that it is to be paged at all times by the operating system. For the I/O buffer of the database management system, therefore, the paging management module of the operating system may execute the I/O processings to the file of the paging external storage device in response to an exceptional page interruption. In other words, while the database management system is executing the buffer management of the I/O buffer, the operating system is also executing the paging management for the I/O buffer of the database management system. In short, the double buffering is executed.

Although the I/O buffer management module of the database management system manages to prepare necessary data on the I/O buffer, the paging management module of the other operating system may have its I/O buffer data paged out from the main memory to the paging file on the external storage device. In this case, when the data of the I/O buffer are referred to, the operating system assigns the main memory to input (i.e., to page in) the page, which is paged out from the paging file on the external storage device, to the assigned main memory. At this time, two I/O operations are executed to affect the performances of the database management system adversely.

This can be carried out from the target of the paging such that the database management system performs the page fixing for the region of the I/O buffer, because the operating system has a function to fix (as will be called the "page fixing") the region of the virtual memory space on the main memory. However, it is premised that the size of the region of the I/O buffer will not exceed the capacity of the main memory.

On the other hand, a method of improving the paging problems is exemplified by providing an expanded memory. This expanded memory is directly connected to the main memory and is composed of the same semiconductor memory elements as those of the main memory so that it is enabled to expand the main memory logically by realizing the data transfer at the unit of a physically fixed page thereby to compensate the shortage of the capacity.

(a) In the prior art, as has been described hereinbefore, if, in the I/O buffer management method of the database management system, an empty buffer on the I/O buffer disappears while a plurality of users are issuing an I/O request to the I/O buffer, the data I/O request from another user finds the status of buffer shortage if there is no page to be accessed to on the I/O buffer. As a result, that I/O request is left waiting, or the page of the buffer to be saved is to be forcibly replaced by the replacement algorithm.

(b) In the buffer management method based upon the QLSM method, on the other hand, the buffer for the locality set size is secured from the I/O buffer by computing the locality set size of the locality set by an optimizing processing module or the like. If, at this time, the buffer for the locality set size cannot be secured because of the buffer shortage, the query execution is delayed by establishing a standby status till the securing becomes possible, or the I/O number is increased by changing the locality set size of the locality set to the securable buffer size. Especially in the relational database management system, in the case of a join operation (i.e., the joining operation of two or more relations) in a query, the locality set size can be computed because the locality set is generated for each relation. Since, however, a plurality of data pages may be repeatedly referred to for the relation to be joined, the locality set suited for the size has to be secured. In the optimizing processing module or the like, however, it is difficult to compute the locality set size accurately. It is not practical for the computed locality set to require a number of buffers. Thus, it is impossible to make the I/O processings sufficiently efficiently.

(c) For the buffer management method based on the QLSM method, on the other hand, the following counter-measures are used. If some query grasps the accessing characteristics for accessing the relation sequentially, the management is accomplished by setting the locality set size at 1 and by using the SB (i.e., Single Buffer) method as the replacement algorithm of the locality set. According to this method, a plurality of buffers are prepared in advance, and an inputting is accomplished at the unit of pages corresponding to the number of the prepared buffers. In other words, no consideration has been taken into the method of pre-read processing method.

(d) In case the block updating is accomplished with sequential reference to the relation, as has been described hereinbefore, the updated pages are written out to the external storage device by the replacement algorithm, when the newly requested page becomes absent in the buffer, and the requested page may be read in. In order to input the new page in this case, the I/O processing, which has been intrinsically unrequired, may take place to cause the deterioration of the performances.

(e) In the database management system, moreover, in case the data are to be transferred from the external storage device to the main memory, the database processing is executed. When a data base machine including the procedure to transferred the processed result to the main memory is to be utilized, the aforementioned block inputting is performed by the database machine, but no consideration is taken into the control of inputting the processed result into the I/O buffer. Nor is taken any consideration into the control of stopping the use of the database machine and switching it into the I/O method of the data by the database management system of the prior art.

(f) Next, the database management system has a processing for generating an intermediate file by the sort merging method as the internal processing. This intermediate file generating processing is accomplished on the I/O buffer. First of all, the following procedures are repeated till the data are read out: the data are read from the database on the external storage device into the I/O buffer and are processed; and the data of one page are written in a buffer on the I/O buffer. The data of the intermediate file thus generated may be outputted to the intermediate result storing file on the external storage device in accordance with the replacement algorithm of the I/O buffer. Next, this intermediate file is re-read so that many I/O processings take place between the I/O buffer and the external storage device till the sort merging processing is ended. Since, however, this intermediate file is not shared, the page inputted by the query processing from another user is swept away by the page replacement algorithm. In case the page is to be referred to again, the buffer to have its page replaced is selected as the inputting buffer, an unnecessary I/O processing occurs such that the page is inputted after the intermediate result in the buffer is outputted before the page inputting to the external storage device. Thus, there arises a problem of the drop of the performances.

(g) Moreover, the database management system outputs the hysteresis information to a hysteresis information outputting buffer to manage it in the management of the hysteresis information. If the buffer is fully occupied by the hysteresis information, the information is outputted to the hysteresis information file on the external storage device. If, at this time, the database management system is troubled during it separation, the database is recovered on the basis of the hysteresis information till a certain instant. At this time, an input processing from the hysteresis information file on the external storage device is caused to acquire the hysteresis information. Thus, there arises a problem that the time period for recovering the database is elongated.

(h) On the other hand, the database management system operates on the virtual memory space, and the I/O buffer to be managed by the database management system also exists on the virtual memory space. What maps this virtual memory space and the main memory is the virtual memory management of the operating system, i.e., the paging management. Without any data on the main memory even if the database management system accesses to the data on the I/O buffer, the data saved in the paging file on the external storage device has to be inputted to the main memory so that it may be restored. On the contrary, the page on the main memory having the data on the I/O buffer is to be paged out by the paging management so that it can be outputted to and saved in the paging file on the external storage device. Since the database management system takes no consideration into such storage hierarchy, there arises a problem that an unnecessary I/O processing is caused by the paging management of the operating system. This problem can be solved by a method of page-fixing the whole I/O buffer of the database management system on the main memory. If, however, the I/O buffer is large-sized, the region to be paged is reduced on the main memory. Thus, there arises a problem that the paging and swapping frequently take place to drop the ability of the whole computer system.

SUMMARY OF THE INVENTION

In order to solve the problems of the prior art thus far described, the present invention has the following first to fifth objects:

In a computer system equipped with a main memory and an expanded memory, the first object of the present invention is to provide a buffer management method, in which a storage hierarchy capable of utilizing an I/O buffer efficiently is taken into consideration by reducing the I/O processings for an external storage device as much as possible.

The second object of the present invention is to provide a buffer management method capable of utilizing the I/O buffer efficiently when an output request to the external memory is reserved and when the input request to the I/O buffer from the external storage device is the pre-read processing request at the units of plural pages, in case the data on the I/O buffer are to be updated.

In the computer system equipped with a main memory and an expanded memory for expanding the main memory logically, the third object of the present invention is to provide a buffer management method capable of shortening the I/O processing time of the I/O buffer management in case no data is present on the expanded memory at the request of the data input processing and in case the data output processing from the I/O buffer is to be accomplished.

The fourth object of the present invention is to provide a buffer management method capable of utilizing the I/O buffer efficiently by reducing the I/O time in case a sequential access is to be accomplished by the accessing characteristics independently of the reference to or updating of the database.

The fifth object of the present invention is to provide a buffer management method capable of utilizing the I/O buffer efficiently in case the database machine is troubled.

In order to achieve the above-specified first object, the buffer management method of the present invention is characterized at (i): in that there are included an I/O buffer group secured on a main memory and an I/O buffer group secured on an expanded memory so that, in case the I/O buffers on the main memory are short, the data I/O processings are executed by saving a portion of the data on the I/O buffers on the main memory into the I/O buffers on the expanded memory by an I/O buffer management program module and by utilizing the I/O buffers on the main memory, which have been stored with the data saved into the expanded memory. (ii) In the I/O buffer management program module of the database management system for managing the database stored on the external memory, another characteristic resides in that there is included a program module for managing the I/O buffer group secured on the main memory and the I/O buffer group secured on the expanded memory so that, in case the I/O buffers on the main memory become short, the I/O buffer management program module executes the data I/O processing by saving the data to be page-replaced by the replacement algorithm of the I/O buffers on the main memory into the I/O buffers secured on the expanded memory and by utilizing the I/O buffer group on the main memory, which has been stored with the saved data. (iii) Still another characteristic resides in that the I/O buffer management program module executes the I/O processing of data by performing a restoration to the buffer, which has its page to be replaced by the replacement algorithm of the I/O buffer on the main memory, in case the data page to be accessed to exists in the I/O buffer on the expanded memory. (iv) A further characteristic resides in that the I/O buffer management program module executes the I/O processing of the data, in case an intermediate file by the sort merging method is to be generated in response to a query from a user, by securing the minimum I/O buffer simultaneously required on the main memory by the sort merging processing and securing a first I/O buffer group and a second I/O buffer group for storing the intermediate file on the expanded memory, by reading the data at a first stage from the database onto the I/O buffer on the main memory to save the intermediate file resulting from the sort merging processing in the first I/O buffer group on the expanded memory, by restoring the data at a second stage from the first I/O buffer group on the expanded memory in the I/O buffer on the main memory, by saving the intermediate file resulting from the sort merging processing in the second I/O buffer group on the expanded memory, and by using the first and second I/O buffer groups on the expanded memory alternately till the operations are ended by the sort merging processing. (v) In case the I/O buffer on the main memory is the hysteresis information management buffer of the database management system, a further characteristic resides in that the I/O processing of the hysteresis information is executed by saving the hysteresis information of the I/O buffer wholly or partially on the expanded memory, when the I/O buffer secured on the main memory is fully occupied by the hysteresis information, and by restoring the hysteresis information saved in the I/O buffer on the expanded memory to the I/O buffer on the main memory. (vi) A further characteristic resides in that the I/O buffer management program module inputs the data to the I/O buffer on the main memory to have its page replaced, by performing the locality set management for dividing the I/O buffer group for each query to the database to decide the locality set replacement algorithm matching the access characteristics of the query to the database thereby to input/output the data, by securing the buffer corresponding to the short size on the expanded memory, when the buffer for the locality set size cannot be secured at the time of execution of the query from the I/O buffer, and by saving the data page to be replaced by the locality set replacement algorithm into the I/O buffer on the expanded memory, in case the data exceeding the size secured by the I/O buffer on the main memory is to be inputted. (vii) Further characteristics reside: in that the database is a relational database having a plurality of relations; in that the relation to be accessed to in response to the query from the user is passed through the locality set to interchange the data; and in that the locality set replaces and controls either the I/O buffer on the main memory for storing the data page of each relation and the I/O buffer on the aforementioned expanded memory in accordance with the replacement algorithm matching the accessing characteristics to the relation. (viii) In the I/O buffer management method for managing the I/O buffer on the main memory secured on the virtual memory space of the virtual memory system, further characteristics reside: in that said I/O buffer has for each plane a management table for storing a location information on the virtual memory region of the I/O buffer, a data page information of the database stored in the I/O buffer; and an update flag indicating the existence of an update for the data of the data page so that the data of the data page stored in said I/O buffer are updated in response to a query of the user; and in that, when an output request of the database of an external storage device for the data page stored on the I/O buffer is generated for the I/O buffer management program module of the database management system, the I/O buffer management program module sets on the update flag of the management table to fix the region of the I/O buffer on the virtual memory onto the main memory. (ix) A further characteristic resides in that the I/O buffer management program module sets off the update flag of the management table of the I/O buffer to have its page replaced by the replacement algorithm of the I/O buffer, by discriminating the update flag, by outputting the data of the I/O buffer to the database stored on the external storage device, when the update flag is on, and by releasing the fixing of the region of said I/O buffer on the virtual memory fixed on the main memory. (x) In the management method of the I/O buffer on the main memory secured on the virtual memory space of the virtual memory system by the management of the database management system, further characteristics reside: in that the I/O buffer has for each plane a management table for storing a location information on the virtual memory region of the I/O buffer, a data page information of the database stored in the I/O buffer and a page fixing flag indicating that the I/O buffer is fixed on the main memory; in that, when an input request at the unit of plural pages from the database stored on the external storage device is generated for the I/O buffer management program module of the database management system in response to a query from the user, the I/O buffer management program module fixes on the main memory the I/O buffer group secured for the data page input thereby to set on the management table page fixing flag of each I/O buffer. (xi) A further characteristic resides in that the I/O buffer management program module performs a database arithmetic operation of inputted plural data pages one by one and releases the fixing of the I/O buffer of the data pages on the main memory, after the arithmetic operation, to set off the page fixing flag of the management table of the I/O buffer. (xii) Further characteristics reside: in that the I/O processing of the data is executed by expanding the database on the external storage device onto the expanded memory; in that the I/O buffer management program module inputs the data absent from the expanded memory from the database on the external storage device in response to a request for the data inputting and saves the data onto the expanded memory, too, thereby to execute the data I/O processings. (xiii) A further characteristic resides in that, when an output is requested for the data of the I/O buffer to have its page replaced by the replacement algorithm of the I/O buffer, the I/O buffer management program module executes the outputting to the database on the external memory and the updating of the I/O buffer having the same data on the expanded memory. (xiv) A further characteristic resides in that the I/O buffer management program module initially loads the I/O buffer secured on the expanded memory with the data of the database on the external storage device at the start of the system so that a block inputting at the unit of a block (or a track) is inputted in the initial loading from the external memory to execute the I/O processing of the data. (xv) In the database management system for executing the processings in accordance with the determined procedures by analysing the queries for data pages from a plurality of users and by determining the corresponding internal processing procedures, further characteristics reside: in that the I/O buffer management program module of the database management system has a sub-module for inputting/outputting the data pages at the unit of one page between the I/O buffer group on the main memory and the external storage device for storing the aforementioned database and a sub-module for inputting/outputting the data pages at the unit of plural pages; and in that the data I/O processing is executed by a locality set management for dividing the I/O buffer group in response to each query for the database and by determining the locality set replacement algorithm matching the accessing characteristics to the database of the query. (xvi) Further characteristics reside: in that the database is a relational one including a plurality of relations; in that the relations to be accessed to in response to a query from the user exchange the data through the locality set; and in that the locality set replaces the buffer for latching the data page of each relation by the replacement algorithm matching the accessing characteristics to the relations. (xvii) A further characteristic resides in that the I/O buffer group has a first status having a buffer group (i.e., a locality set) having a data page to be accessed to in response to each query, a second status having a buffer group (i.e., a secondary buffer) to be chained by the replacement algorithm by excluding a buffer for latching the data page exceeding each locality set size by the replacement from each locality set, and a third status having a buffer group (i.e., a free buffer) in which a buffer having no data page latched yet is changed by the replacement algorithm. (xviii) Further characteristics reside: in that, in case the I/O management program module executes the I/O processings at the unit of a plurality of pages, the data page group is inputted in block at the unit of plural pages when all the tuples are to be updated while being sequentially accessed to the relations; and in that the updated data page group is outputted in block to the external storage device immediately before the subsequent block input when the updating of the tuples of the read data page group is ended. (xix) A further characteristic resides in that, in case data are to be transferred from the external storage device to the main memory, the database machine for the database processing is utilized to control the operation of outputting all the data pages within a retrieval range fed from the database machine and the operation of outputting the data pages containing at least one tuple (or record) satisfying the given retrieval condition equation. (xx) Further characteristics reside: in that, in the operations of outputting all the data pages within the retrieval range given by the database machine, a buffer group sufficient for receiving the data pages for the retrieval range from the I/O buffer is secured; and in that whether or not a data page within the retrieval range given in the I/O buffer exists is decided so that the secured buffer group may read in the absent page only whereas the I/O buffer unused may be secured for a subsequent input request. (xxi) Further characteristics reside: in that, in the operation of outputting the data pages containing at least one of tuples (or records) satisfying the retrieval condition equation given by the database machine, an I/O buffer sufficient for receiving data pages of at least one page is secured from the I/O buffers; and in that whether or not a data page within the retrieval range given in the I/O buffer exists is decided so that the information of the absent page and the retrieval condition equation may be given to the database machine and so that the data page containing at least one tuple (or record) satisfying the retrieval condition equation may be received by the secured buffer. (xxii) A further characteristic resides: in that, in case it is detected that the database machine has been troubled, the retrieval request by said database machine is interrupted to execute the subsequent inputting/outputting of the data by using an I/O management program sub-module for inputting/outputting the data pages at the unit of one page and an I/O management program sub-module for inputting/outputting the data pages at the unit of plural pages.

In the present invention: (a) In a computer system equipped with a main memory and an expanded memory for expanding the main memory logically, a program operating on a virtual memory space managed by the virtual memory management of an operating system for managing the inputting/outputting of the data on the external storage device by using an I/O buffer has a function to manage a second I/O buffer secured on the expanded memory, so that the I/O processing for the external memory may be reduced to utilize the I/O buffer efficiently by saving the data of the I/O buffer on the virtual space, if necessary, into the I/O buffer on the expanded memory and by restoring the data of the I/O buffer on the expanded memory to the I/O buffer on the virtual space. (b) If the data of some buffer on the I/O buffer is updated to reserve the output request for the external storage device, so that the I/O buffer is to have its pages replaced by the replacement algorithm. The I/O buffer is efficiently utilized by not subjecting the buffer to a paging management of the operating system by page-fixing it on the main memory till the outputting to the external storage device. In case the input request of the data from the external storage device to the I/O buffer is the request for the pre-read at the unit of plural pages, the I/O buffer is also efficiently utilized by bringing it out of the paging management of the operating system till the end of the pre-read data by page-fixing the buffer of the pre-read unit on the main memory. (c) In a computer system equipped with a main memory and an expanded memory for expanding the main memory logically, a database on the external storage device managed by the database management system is also arranged on the expanded memory. the I/O processing for the external storage device is reduced to shorten the I/O processing time of the I/O buffer management by inputting/outputting the database on the external storage device in case no data exists on the expanded memory for the inputting request of the data and in case the data from the I/O buffer are outputted. (d) In case the accessing characteristics are sequential independently of the reference to or the updating of the database, it is decided which of the pre-reading in the buffer at the start of the inputting/outputting or the block writing from the buffer to the external storage device is to be executed to determine the pre-read unit and the block write unit so that the I/O time is shortened to utilize the I/O buffer efficiently. (e) In a system utilizing a database machine for executing the database arithmetic operations to transfer the result of the database arithmetic operations to the main memory when the data transfer is to be executed from the external storage device to the main memory, the retrieval request for the database machine is interrupted, in case the database machine is troubled, the data inputting/outputting are then switched to those of the plural pages of the database management system or those of one page to utilize the I/O buffer efficiently.

The foregoing and other objects, advantages, manner of operation and novel features of the present invention will be understood from the following detailed description when read in connection with the accompanying drawings.

BRIEF DESCRIPTION OF THE DRAWINGS

FIGS. 8(a), 8(b), 8(c) and 8(d) are diagram showing the informations which are stored in the individual management tables of FIG. 1;

FIG. 33 is a processing flow chart showing the block I/O processing module when the database machine is troubled.

DETAILED DESCRIPTION OF THE PREFERRED EMBODIMENTS

The present invention will be described in more detail in the following in connection with the embodiments thereof with reference to the accompanying drawings.

Figure 2:
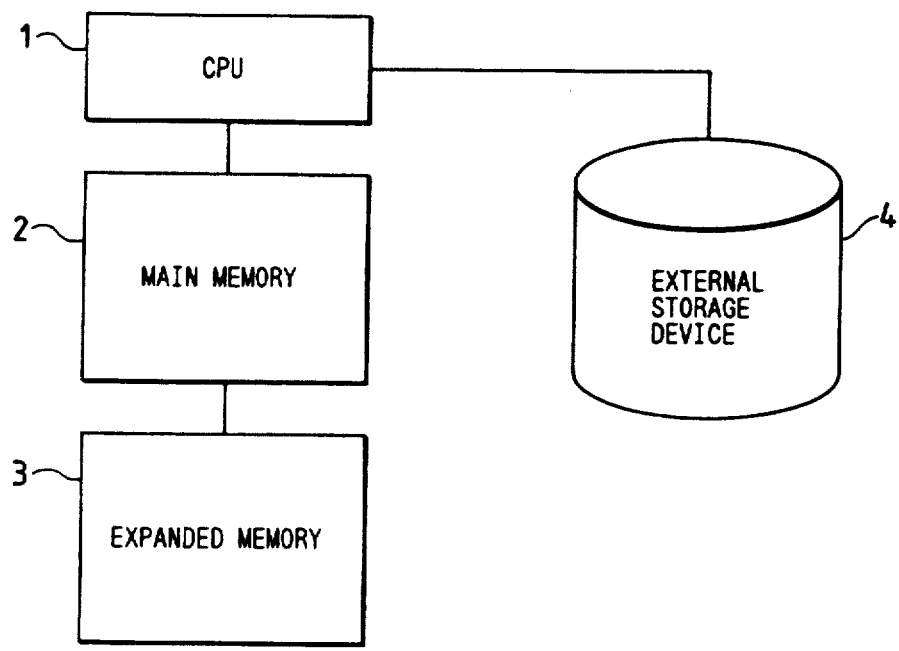
FIG. 2 is a diagram showing the hardware structure of the computer system of FIG. 1.

FIG. 2 is a diagram showing the hardware structure of a computer system to which the present invention is applied.

In FIG. 2: reference numeral 1 designates a central processing unit (i.e., CPU) for processing data and controlling individual modules in the system; numeral 2 designates a main memory for storing programs and various data to be executed by the CPU 1; numeral 3 designates an expanded memory composed of semiconductor memory elements for expanding the main memory 2 theoretically; and numeral 4 designates an external storage device including a magnetic disc unit or the like.

Figure 1:
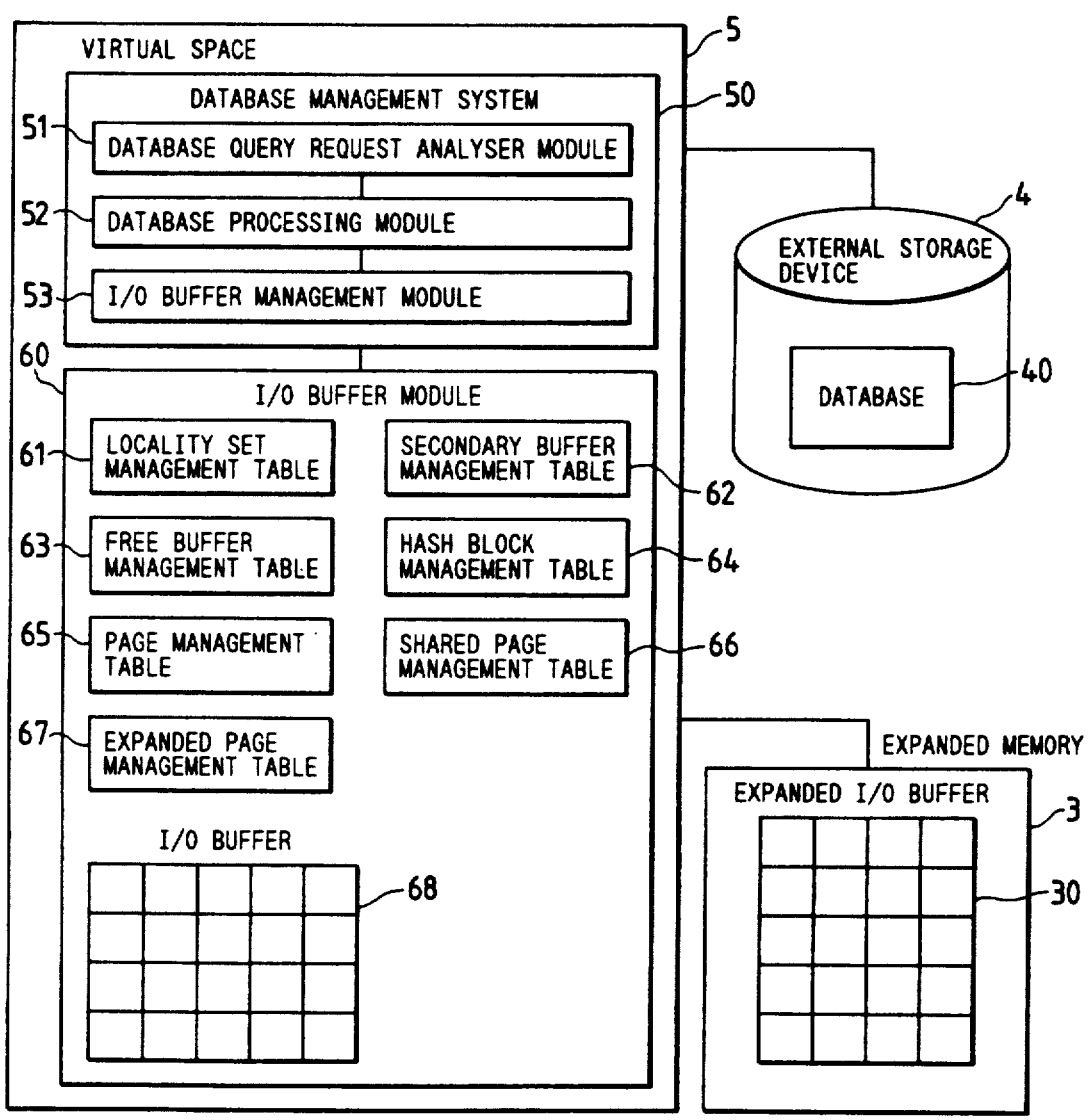
FIG. 1 is a block diagram showing the whole structure of a computer system to which is applied a buffer management method according to a first embodiment of the present invention.

FIG. 1 is a diagram showing the structure showing of the overall functions in the memories operating on the hardware structure shown in FIG. 2.

In FIG. 1, reference numeral 5 designates a virtual space, on which both a database management system 50 and an I/O buffer module 60 operate.

The external storage device 4 is stored with a database 40 which is managed by the database management system 50. This database management system 50 is equipped with: a database query request analyser module 51 for analysing the syntax and meaning of a database query request coming from a user; a database processing module 52 for executing database processings such as selections or joins in accordance with internal processing procedures inquired by determining the processing procedures; and an I/O buffer management module 53 for inputting or outputting data to an I/O buffer through the I/O buffer module 60 in response to the I/O processing request of the data from the database processing module 52.

In a relational database, the data are constructed of a logical data structure called the "relation" which is composed of a plurality of tuples. This relation is divided into a plurality of those pages having a physically fixed length or the I/O unit of the database management system 50, which are stored in the database 40 of the external storage device 4.

The I/O buffer module 60 shown in FIG. 1 is composed of: a locality set management table 61 for managing the locality set, which is divided from the buffer for each relation in response to the database query request from the user; a secondary buffer management table 62 for managing a secondary buffer belonging to none of the locality set by latching the page which is expelled from the locality set by the replacement algorithm of the locality set after the end of the database query request processing; a free buffer management table 63 for managing an I/O buffer on a virtual space having no page yet and an I/O buffer on the expanded memory; a hash block management table 64 for managing the chain of buffers as a result of the hashing in the case of a buffer search in response to an I/O request from the database processing module; a page management table 65 for latching the location information, page number and status (dictating which locality set, secondary buffer or free buffer is belonged to) of each buffer on the virtual space for storing the pages; a shared page management table 66 for managing the page in case the page is shared among a plurality of locality sets; an expanded page management table 67 for latching the location information, page number and status of each buffer for storing the pages, by which the I/O buffer on the virtual space is to be theoretically expanded; an I/O buffer on the virtual space for storing the pages of the database; and an expanded I/O buffer 30 on the expanded memory 3.

In the buffer management method of the present invention: (a) By the I/O buffer 68 on the main memory 2 and the I/O buffer 30 on the expanded memory 3, a program module for I/O processing of the data is provided so that the I/O processing with the external storage device 4 is accomplished by the I/O buffer 68 on the main memory 2. In the case of shortage of the I/O buffer 68 on the main memory 2, the data are saved to the I/O buffer 30 on the expanded memory 3 by the replacement algorithm from the I/O buffer 68 on the main memory 2. As a result, the I/O buffer 30 on the expanded memory 3 has the data, in case the data of the buffer having its pages to be replaced is to be referred again, and the data may be restored to the I/O buffer 68 on the main memory 2. Thus, since any inputting of data is not required for the external storage device 4, the time for accessing to the data is shortened, and the processing is not delayed due to shortage of the buffer. (b) The I/O buffer management module 53 of the database management system 50 is equipped a program module for managing the I/O buffer 68 on the main memory 2 and the I/O buffer 30 on the expanded memory 3. At the time of data input request, when the I/O buffer 68 on the main memory 2 is occupied to become short of the buffer, the data of some buffers are saved to the I/O buffer 30 on the expanded memory 3 by the replacement algorithm of the I/O buffer 68 on the main memory 2 so that they are inputted to the I/O buffer 68 on the main memory 2 having its pages replaced. As a result, the database processing request is not awaited due to shortage of the buffers. (c) In the case of the locality set management for dividing the I/O buffer group for each query of the database in the I/O buffer management module 53 of the database management system 50, the locality set determines the buffer number and replacement algorithm matching the characteristics of the access to the database inquired. If the buffers of the locality set cannot be secured due to shortage of the I/O buffer, the short buffers are acquired from the I/O buffer 30 on the expanded memory 3. If the data, which cannot be latched in the I/O buffer 68 on the main memory 2 in the locality set, are saved in the I/O buffer 30 on the expanded memory 3, the I/O processing of the external storage device 4 can be reduced. Since the buffer number of the locality set is logically satisfied, it is possible to perform the I/O processing of the data efficiently. (d) In case, moreover, an internal processing for preparing an intermediate file by the sort merging is to be performed in response to the query from the user in the database management system 50, the minimum buffer required simultaneously for the sort merging is secured on the main memory 2. In this sort merging, only the data required during the processing are located on the main memory 2 so that the merged result is saved to the first or second I/O buffer 30 on the expanded memory 3. As a result, the I/O buffer 68 on the main memory 2 can be minimized to perform the I/O buffer management efficiently without outputting an intermediate file to the external memory 4 during the sort merging. (e) If, moreover, a buffer for the hysteresis information management is fully occupied with the hysteresis information in the hysteresis data management of the database management system 50, the database can be restored by relieving the hysteresis information to the I/O buffer 30 on the expanded memory 3 and by restoring the hysteresis data from the I/O buffer 30 on the expanded memory 3 when the system is troubled. As a result, the I/O processing of the external storage device 4 can be reduced to shorten the time period for restoring the database. (f) Moreover, the I/O buffer to be handled by the database management system 50 is secured on the virtual space 5 of the virtual storage system. The pages are fixed on the main memory 2 for both the buffer updated by the database processing and the buffer group to be pre-read at a unit of plural pages from the database 40 on the external storage devices 4. As a result, the fixed pages come out of the paging management of the operating system so that any unnecessary I/O processing is not performed.

(g) The database 40 on the external storage device 4 to be managed by the database management system 50 is expanded on the expanded memory 3, and the input processing of data in the I/O buffer management module 53 is accomplished from the database 40 on the expanded memory 3. Without any data on the expanded memory 3, the data are inputted from the database 40 on the external storage device 4 and saved onto the expanded memory 3. If, moreover, an output request is made for the page to be replaced by the replacement algorithm of the I/O buffer management module 53, an output processing is performed for the database 40 on the external storage device 4, and the buffer having the same data on the expanded memory 3 is also updated. As a result, the I/O processing of the database 40 on the external storage device 4 can be minimized, as needed, so that the I/O processing time for the database on the expanded memory 3 can bury the access gap of the I/O processing time for the external storage device 4. Moreover, the database 40 on the external storage device 4 is initially loaded in the I/O buffer 30 the expanded memory 3 at the start of the database management system 50 so that the data input processing is limited to the input from the expanded memory 3.

(h) Between the I/O buffer 68 and the external storage device 4, there are provided a program module for the I/O processing at a unit of one page and a program module for the I/O processing at a unit of plural pages. In the I/O buffer management module 53 of the database management system 50, the locality set management for dividing the I/O buffer group is performed for each query for the database 40. This locality set performs the data I/O processing efficiently by setting the buffer number and replacement algorithm matching the characteristics of the access to the database 40 inquired. Especially, the locality set in the query case of the sequential accesses to the database 40 is inputted at a unit of plural pages and is latched till the database processing of all the pages is ended, so that the pages are not swept off from the I/O buffer 68 in response to the database access request by another user. The locality sets requesting accesses to the same relation allow the same page to be shared, so that the pages on the I/O buffer 68 can be efficiently utilized.

On the other hand, the locality set in the query case for updating the database 40 sequentially performs an outputting at a unit of plural pages. After this outputting, the buffer does not belong to any of the locality set in the I/O buffer 68 so that the buffer having no page for inputting the pages hardly selects the buffer awaiting the updating the database 40 in response to the database access request by another user. Thus, an unnecessary I/O processing can be prevented.

In the data transfer from the external storage device 4 to the main memory 2, moreover, the I/O buffer management module 53 is equipped with a program module making use of the database machine for the database processing. By applying the database processing by the database machine, it is possible to reduce the load of the database processing to be accomplished in the database management system 50. It is also possible to select the I/O programs other than that for the existing one-page input/output and the input/output at a unit of plural pages of the database management system 50. Incidentally, in case the database machine is troubled, a request for retrieval by the database machine can be interrupted to switch the programs to that for the existing one-page input/output and the input/output at a unit of plural pages of the database management system 50, thereby to prevent the functional stop of the database management system 50 due to the troubles of the database machine.

Figure 3:
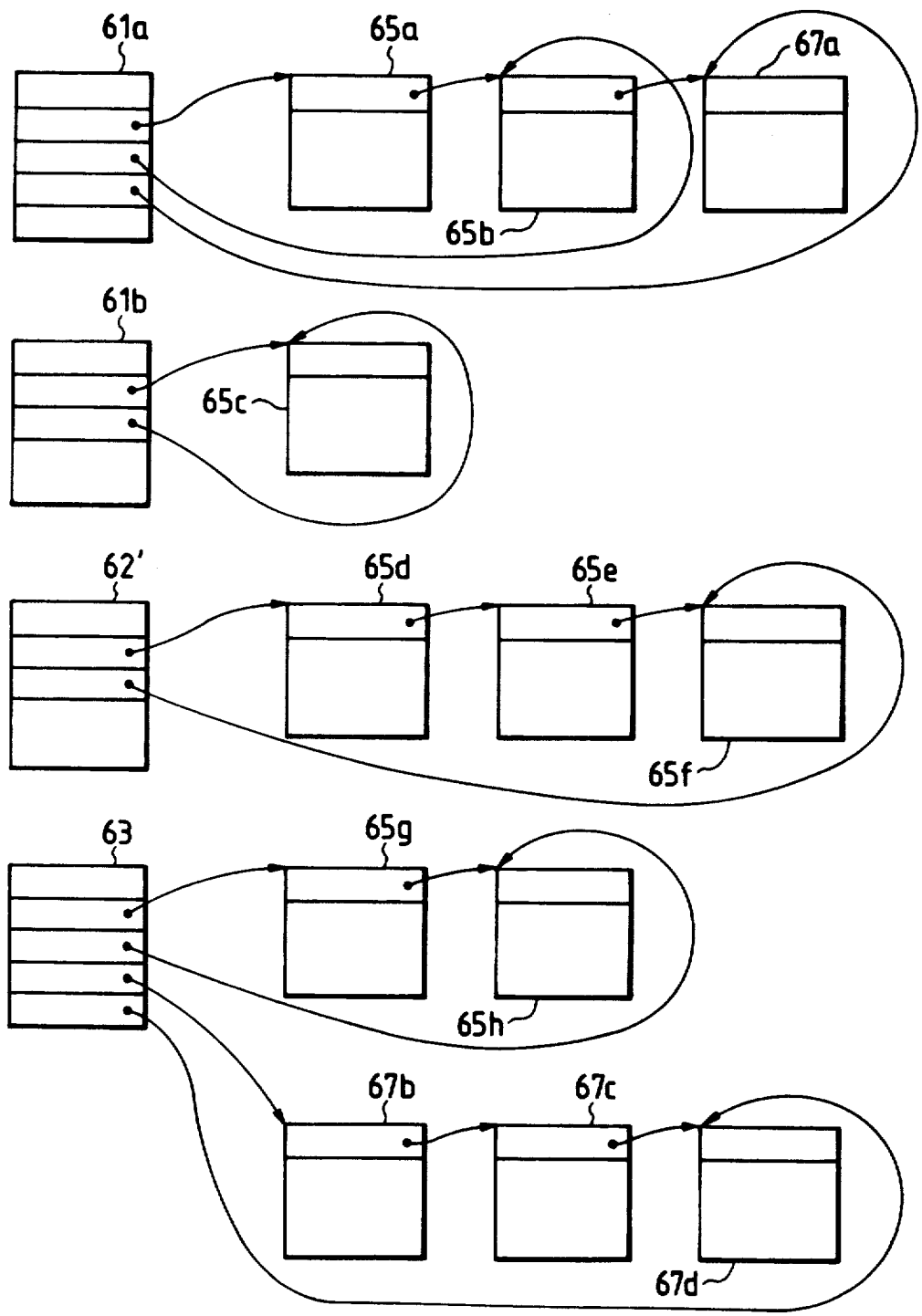
FIG. 3 is a diagram showing the table relations of an I/O buffer module of FIG. 1.

FIG. 3 is a diagram showing the relations of the tables of the I/O buffer module of FIG. 1.

FIG. 3 shows the status at the I/O buffer module 60, namely, the relations of the individual management tables of the locality set, secondary buffer and free buffer.

Here, it is assumed that there be two locality sets, which are managed by locality set management tables 61a and 61b, respectively. The locality set management table 61a reads in three data pages and chains page management tables 65a and 65b and an expanded page management table 67a by the replacement algorithm of said locality set. On the other hand, the locality set management table 61b reads in one data page and chains a page management table 65c by the replacement algorithm of said locality set.

As to the secondary buffer, the data page failing to belong to any locality set of the three pages is chained as page management tables 65d, 65e and 65f to the secondary buffer management table 62 by the replacement algorithm FIFO of the secondary buffer.

As to the free buffer, the free buffer management table 63 has three planes of I/O buffers on the virtual space 5 and three planes of expanded I/O buffers on the expanded memory 3, which are chained as page management tables 65g and 65h of the I/O buffers on the virtual space 5 and expanded page management tables 67b, 67c and 67d of the expanded I/O buffers on the expanded memory 3 by the replacement algorithm FIFO of the individual free buffers.

Figure 4:
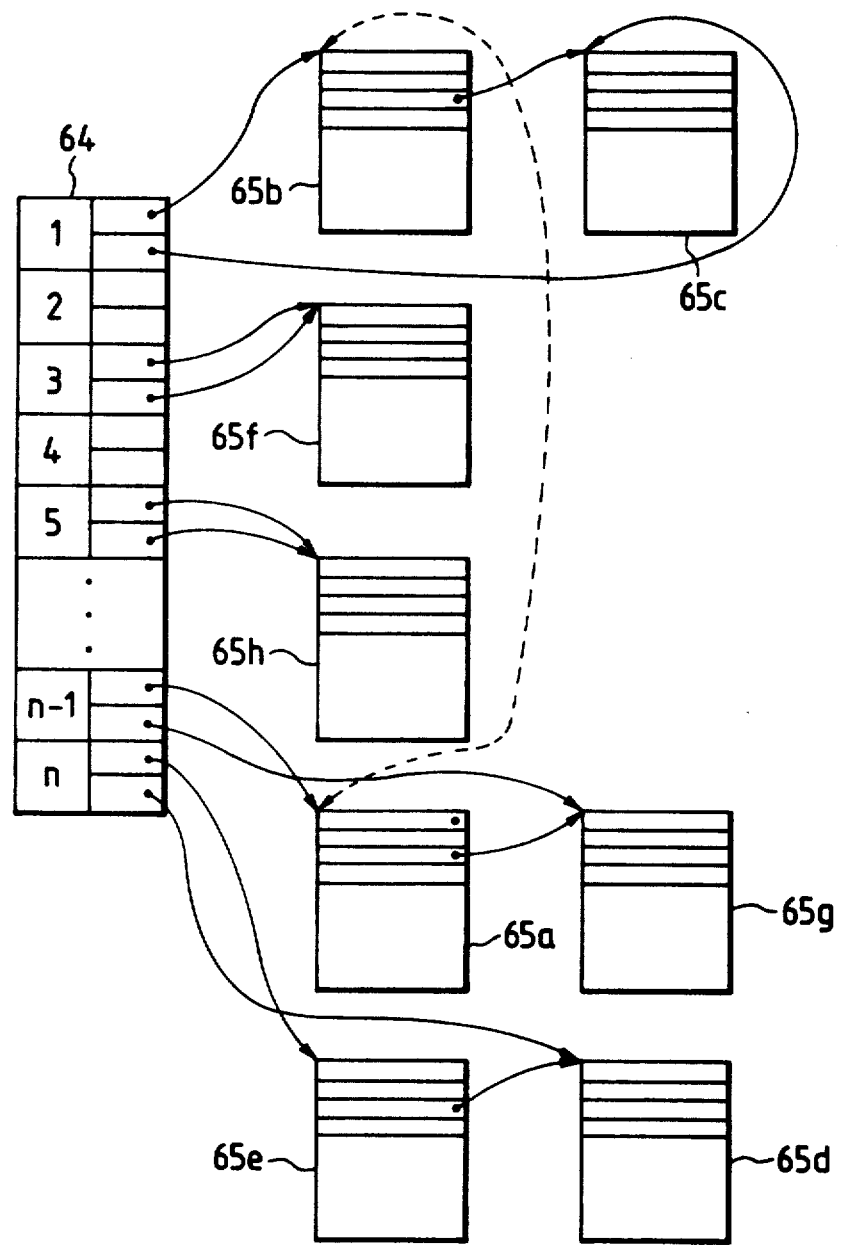
FIG. 4 is a diagram showing an example of the structure of a hash block management table of FIG. 1.

FIG. 4 is a diagram showing the structure of an example of the connections of the hash block management table of FIG. 1.

The relations between the hash block management table 64 and the I/O buffer 68 of the I/O buffer module 60 will be described with reference to FIG. 3. The hash block management table 64 has buffer chain information corresponding to the number of the I/O buffers under consideration. To the hash value 1 of the hash block management table 64, there are chained the page management tables 65b and 65c of FIG. 3. Moreover: the page management table 65f is chained to the hash value 3; the page management table 65h is chained to the hash value 5; and the page management tables 65e and 65d are chained to a hash value (n − 1), by the pointers of the respective hash chains. At this time, in the individual buffer chains of the locality set management tables 61a and 61b of FIG. 3, the page management tables are chained by the pointers, as indicated by a broken line in FIG. 4.

Figure 5:
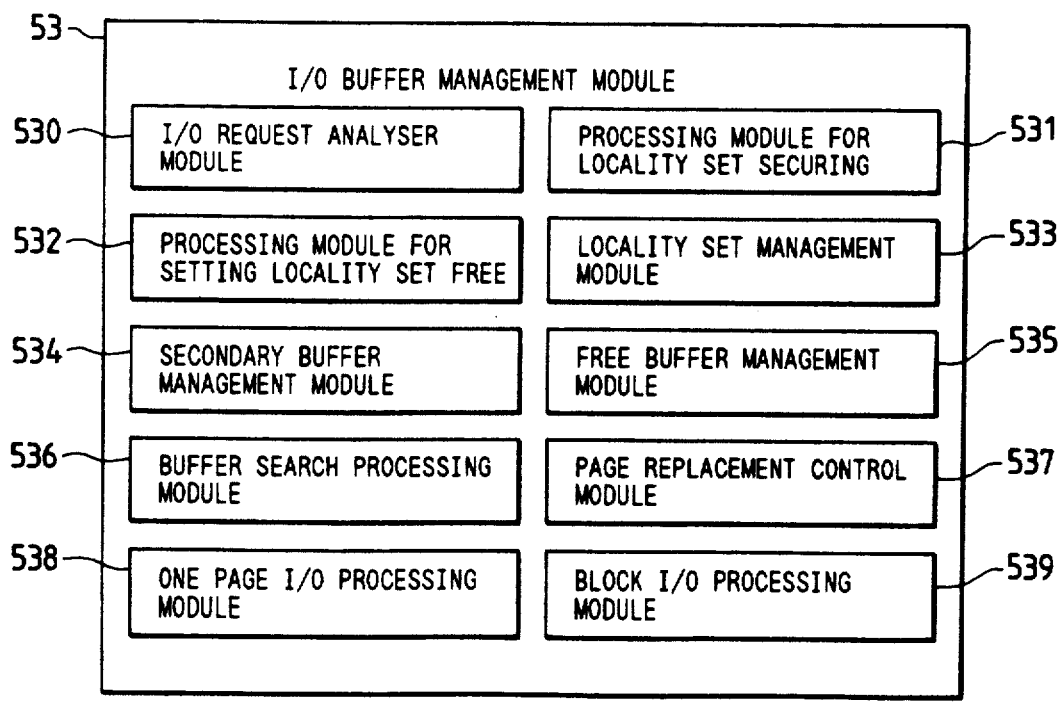
FIG. 5 is a block diagram showing the functions of the I/O buffer management module of FIG. 1.

FIG. 5 is a diagram showing the detailed structure of the I/O buffer management module of FIG. 1.

The I/O buffer management module 53 is composed of: an I/O request analyser module 530 for analysing the request for securing and setting-free of the locality set from the database processing module 52, the request for the input/output of the data page and so on; a processing module 531 for locality set securing for securing and initializing the locality set management table when a locality set securing is requested; a processing module 532 for setting the locality set, i.e., the locality set management table 61 free by re-chaining a buffer in the locality set to the secondary buffer when the setting-free of the locality set is requested; a locality set management module 533 for controlling replacement of a buffer in the locality set and prevention of the same from exceeding the size of the locality set; a secondary buffer management module 534 for controlling replacement of the secondary buffer by the FIFO; a free buffer management module 535 for controlling individual replacements of free buffers on the virtual space and the expanded memory 3 by the FIFO; a buffer search processing module 536 for searching whether or not a data page (or group) requested for an input/output exists in a buffer; a page replacement control module 537 for rechaining a buffer by the replacement algorithm in the aforementioned locality set and disconnecting and connecting the buffer in accordance with the transfer of the buffer between the locality set and the secondary buffer; a one-page I/O processing module 538 for inputting/outputting one page from the external storage device 4 when the inputting/outputting of one page is requested for the page which has been made absent by the aforementioned buffer search processing module 536; and a block I/O processing module for accomplishing a block inputting/outputting when a pre-reading or a block writing is requested.

Figure 6:
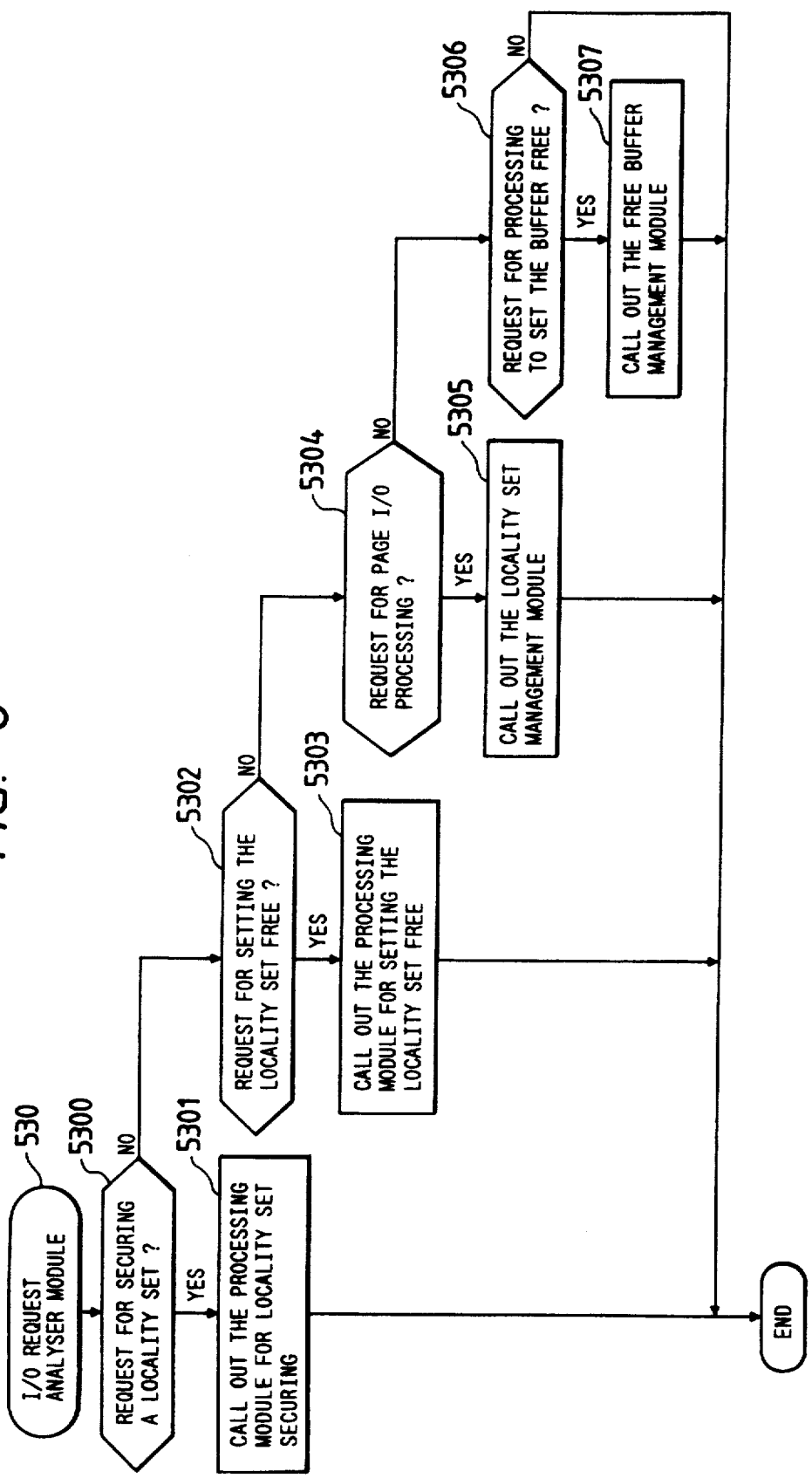
FIG. 6 is a processing flow chart showing an I/O request analyser module of FIG. 5.

FIG. 6 is a processing flow chart of the I/O request analyser module of FIG. 5.

As has been described hereinbefore, the I/O request analyser module 530 plays a role to analysing the I/O request to the database 40 for the database processing module 52 and the I/O buffer management module 53.

First of all, the request from the database processing module 52 is decided. If the request is for securing the locality set at the start of the query processing, the control is transferred to the locality set securing processing unit 531 (at Steps 5300 and 5301). If, on the contrary, the request is for setting the locality set free, the control is transferred to the locality set setting-free processing module 532 (at Steps 5302 and 5303). If, on the other hand, the request is for the page I/O processing, the control is transferred to the locality set management module 533 (at Steps 5304 and 5305). If, on the contrary, the request is for setting the buffer free, the control is transferred to the free buffer management module 535 (at Steps 5306 and 5307). Thus, the processing are sorted in accordance with the request for the I/O buffer management module 53.

Figure 7:
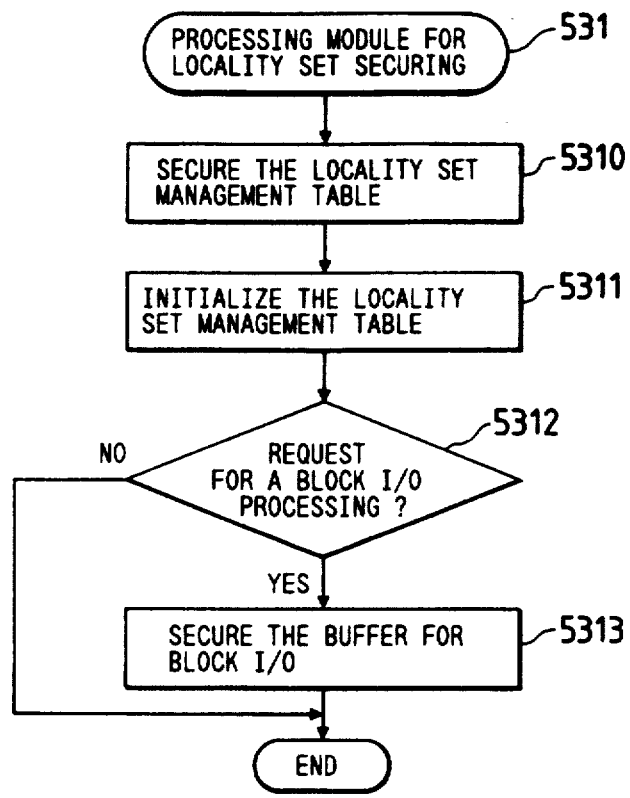
FIG. 7 is a processing flow chart showing a processing module of FIG. 5 for setting the locality set free.

FIG. 7 is a detailed processing flow chart of the locality set securing processing module of FIG. 5.

The locality set securing processing module 531 secures and initialize the locality set matching the accessing procedures which are determined by analysing a query at the start of the query processing.

First of all, the locality set management table 61 in an unused status is secured from the locality set management table 61 of the I/O buffer module 60 shown in FIG. 1 (at Step 5310). Next, the locality set information for the query are set for the locality set management table 61 secured. Next, the locality set information for the query are set for the locality set management table 61 secured. If the initialization of the locality management table 61 secured is ended (at Step 5311), it is decided (at Step 5312) whether or not the query using the locality set under consideration is the block I/O processing. In the case of the block I/O processing, the buffer for the locality set is secured in advance from the I/O buffer 68 (at Step 5313).

FIG. 8(a) is a table showing the informations of the locality set management table in the present invention.

This locality set management table 61 is stored with: an ID for retrieval 610 for discriminating the query processing; a locality set ID for discriminating the locality set of the query in the I/O buffer management module 53; a locality set size 612; an assigned page number 613 in the locality set for offering the number of buffer planes assigned in the locality set by the query; first and last buffer addresses 614 and 615 for locating the first and last of the chain of the page management table 65 for managing the buffers assigned to the locality set; an expanded I/O buffer first address 616 for providing the first address of the expanded page management table 67 of the expanded I/O buffer assigned to the locality set; a replacement algorithm 617 for instructing a method of controlling the replacement of buffers in the locality set under consideration; a block I/O request specification information 618 for specifying whether or not the query using the locality set under consideration is caused to perform the pre-read processing or the block writing processing by the I/O buffer management module 53; and a relation information 619 to be accessed to in response to said query.

FIG. 8(b) is a diagram showing the informations of the page management table in the present invention.

This page management table 65 is stored with: a buffer attribute information 650 such as an information for discriminating the relation as the locality set ID, i.e., the information relating to the aforementioned locality set and the information of the page to be managed by said page management table 65; a buffer number 651 for discriminating the buffer under consideration; forward and backward pointers 652 for the page management table for locating the chain relations of a plurality of page management tables 65; hash chain forward and backward pointers 654 and 655 for locating the chain of the buffer belonging to the hash value which has been determined by a hash function for speeding up the page search; a page number 656 managed by said page management table; an output request flag 657 for indicating whether or not an output request to the external storage device 4 is issued from the page managed by said page management table 65; and a page fix flag 658 for indicating whether or not the buffer managed by said page management table 65 is has its page fixed on the main memory 2.

Figure 8C:
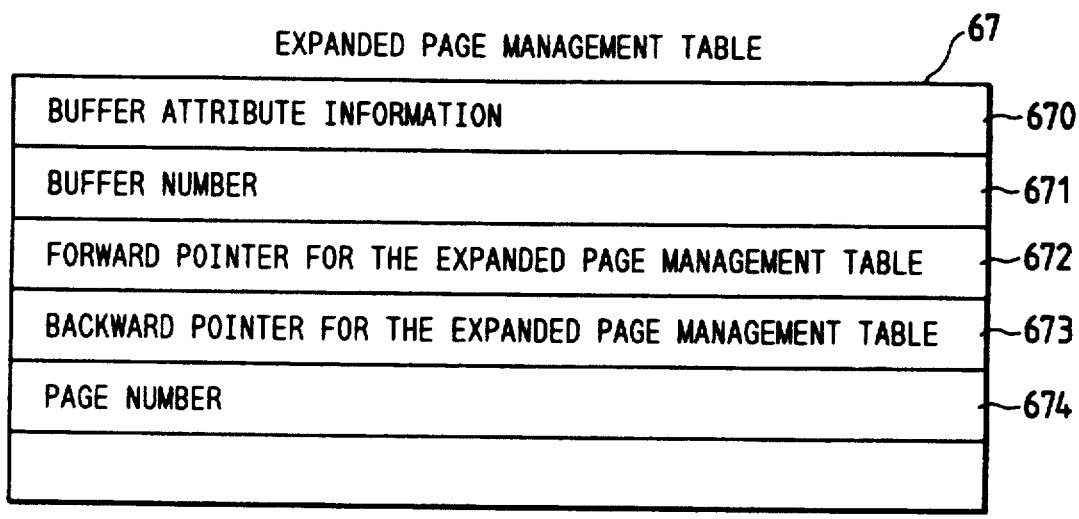

FIG. 8(c) is a diagram showing the informations of the expanded page management table in the present invention.

The expanded page management table 67 is stored with: a buffer attribute information 670 similar to that of the aforementioned page management table 65; a buffer number 671 for discriminating the buffer under consideration; forward and backward pointers 672 and 673 for the expanded page management table for locating the chain relations of the plural expanded page management tables; and a page number 674 to be managed by said expanded page management table 67.

Figure 8D:
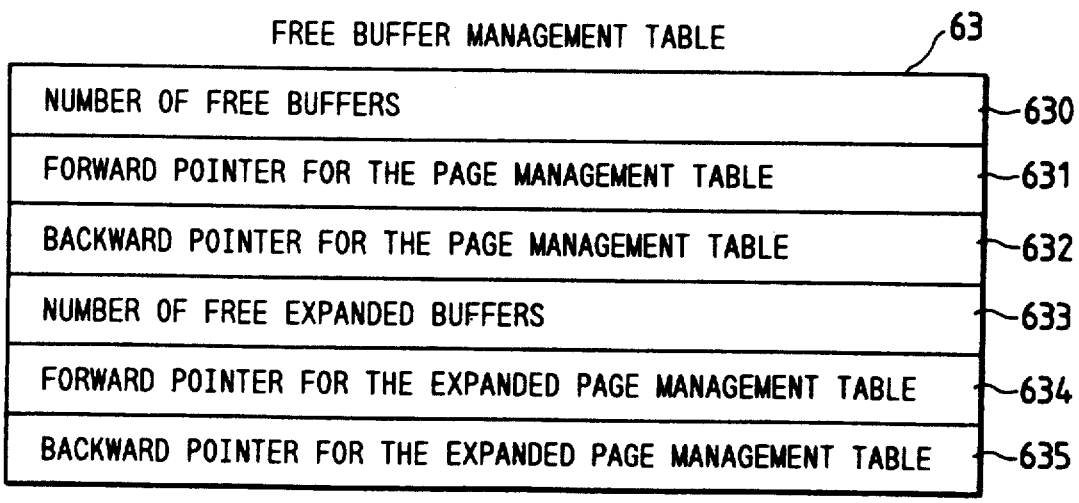

FIG. 8(d) is a diagram showing the informations of the free buffer management table in the present invention.

The aforementioned page management table 65 and expanded page management table 67 are managed at an initial stage by the free buffer management table 63 of the I/O buffer module 60. This free buffer management table 63 is stored with: a free buffer number 630 or the number of the planes of the free buffers of the I/O buffer 68 of the I/O buffer module 64; forward and backward pointers 631 and 632 for the page management table for locating the chain relations of the page management table of the plural free buffers; a free expanded buffer number 633 or the number of the planes of the free buffers of the expanded I/O buffer 30 of the expanded memory 3; and a backward pointer 635 for the expanded page management table for locating the relations of the chain relations of the expanded page management table of plural free expanded buffers.

Figure 9:
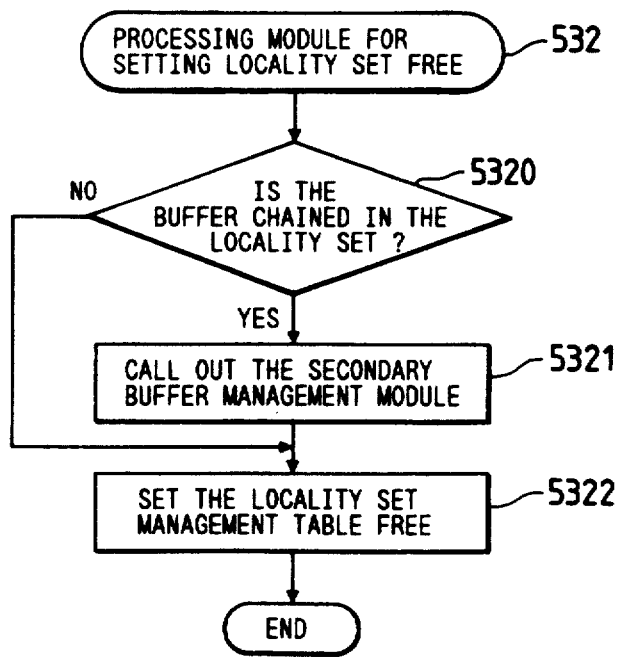
FIG. 9 is a processing flow chart showing the processing module of FIG. 5 for setting the locality set free.

FIG. 9 is a processing flow chart of the locality set setting-free processing module of the I/O buffer management module.

In case the request for the I/O buffer management module 53 is that for setting the locality set free, the locality set setting-free processing module 532 operates. First of all, it is decided whether or not the buffer is chained in the loclaity set to be set free (at Step 5320). In case the buffer is chained in the locality set, it is released from the same locality set and is connected with the secondary buffer chain failing to belong to any locality set. In case another locality set is shared, the control is transferred to a secondary buffer management module 524 for processing the connection with the shared locality set (at Step 5321). If, moreover, there is no buffer in the locality set or if the buffer in the locality set is released by the secondary buffer management module 534, the locality set management table 61 of said locality set is released into an unused status (at Step 5322).

Figure 10A:
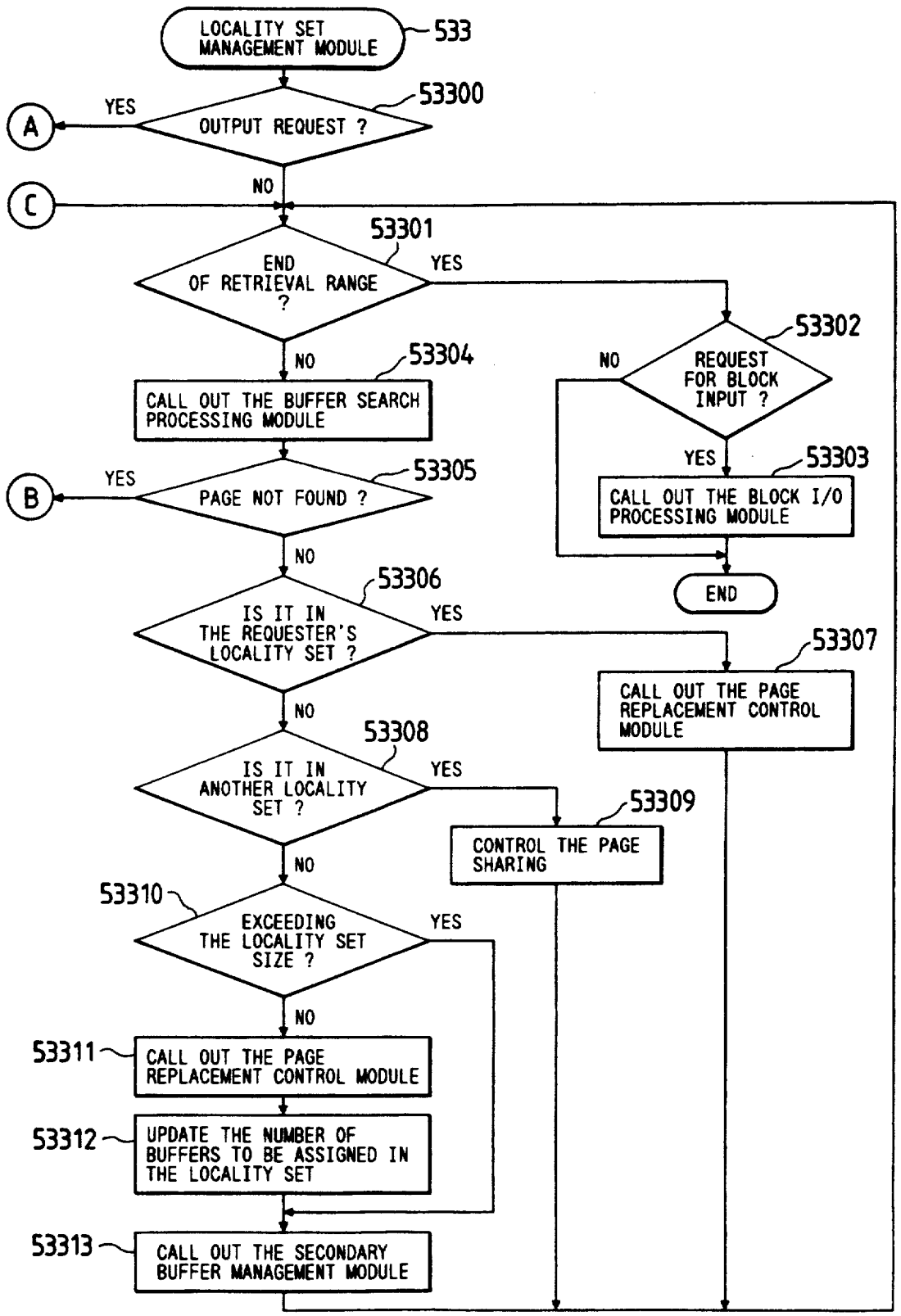
FIGS. 10(a) and 10(b) and 10(c) are processing flow charts showing the locality set management module of FIG. 5.

FIG. 10(a) is a processing flow chart of the locality set management module in the present invention.

In case the request for the I/O buffer management module 53 is that for the page I/O processing, the locality set management module 533 operates. First of all, it is decided whether the page I/O processing request is an input request or an output request (at Step 53300). In the case of the input request, whether or not the processing is ended is decided for the page retrieval range by the input request so that the one-page input and the block input may be processed in a mixed manner (at Step 53301). If the retrieval range is in the end status, it is decided whether or not the request is the block input request (at Step 53302). If the request is the block input request, the control is transferred to the block I/O processing unit to execute the block input (at Step 53303). In case, on the other hand, the retrieval range is not in the end status in the locality set management module 533, the control is transferred to the buffer search processing module 536 for searching whether or not the requested page exists in the I/O buffer (at Step 53304).

Figure 11:
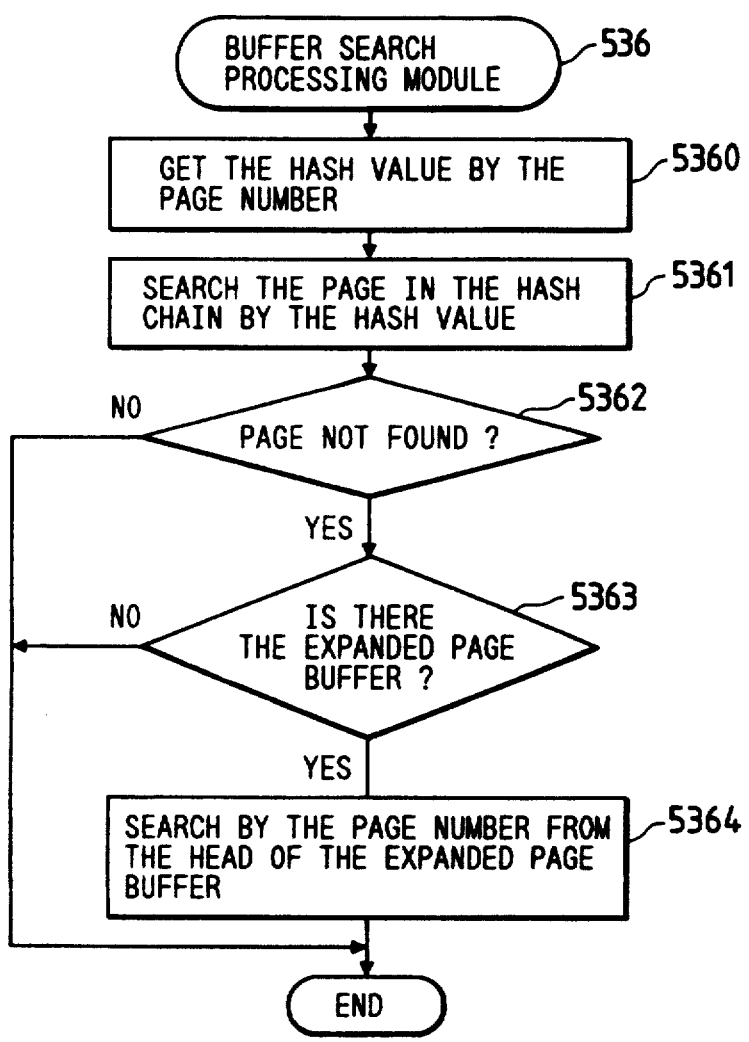
FIG. 11 is a processing flow chart showing the buffer search processing module of FIG. 5.

FIG. 11 is a processing flow chart of the buffer search processing module.

If the control is transferred to the buffer search processing module 536, as shown in FIG. 10(a), the hash value is taken according to a certain hash function by the number of the requested page (at Step 5360). The page is searched by the got hash value from the chain of the buffer having said hash value (at Step 5361). As a result, it is decided whether or not the page exists in the I/O buffer on the virtual space 5 (at Step 5362). In the absence of the page, it is decided whether or not the expanded I/O buffer is chained in the locality set having requested said page (at Step 5363).

With the expanded I/O buffer, the chain of the expanded page management table 67 is searched from the expanded I/O buffer head address 616 of the locality set management table 61 of FIG. 8(a) (at Step 5364).

Reverting to FIG. 10(a), it is decided as a result of the search of the buffer search processing module 536 whether or not the page is found (at Step 53305). In case the page is not absent, i.e., in case the page is found on the I/O buffer, it is decided at first whether or not the page found on the buffer is chained in the query locality set already requested by the page (at Step 53306). In case the page is chained in the requested locality set, the control is transferred to the page replacement control module 537 so as to replace the chain of the buffer in the locality set (at Step 53307). In case the page is not chained in the requested locality set, it is decided whether or not said page is chained in another locality set (at Step 53308). In case the page is chained in another locality set, the shared page management table 66 is chained to the requested locality set so that said page may be shared even by the requested locality set, to accomplish the page sharing control processing for chaining the shared page management table 66 in the page management table 65 of the shared page (at Step 53309).

In case the page is not chained in another locality set, i.e., in case the page exists on the secondary buffer, whether or not the locality set size is exceeded is decided in dependence upon whether or not the assigned buffer number in the requested locality set is equal to the locality set size (at Step 53310). In case the locality set is not exceeded, the control is transferred to the page replacement control unit 537 to connect said page to the required locality set from the secondary buffer (at Step 53311). After this, the number of buffers to be assigned in the locality set in the locality set management table of the required locality set is updated (at Step 53312). Then, the control is transferred to the secondary buffer management module 534 so that the page management table 65 of the page existing in the buffer is released from the chain of the secondary buffer (at Step 53313).

Figure 10B:
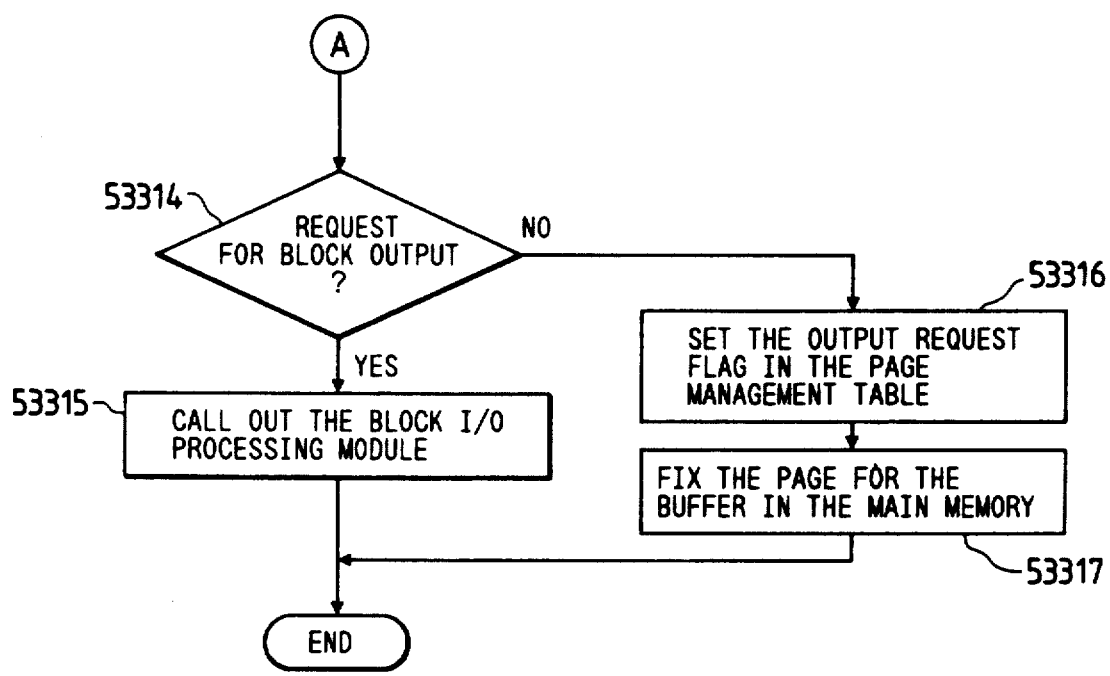

Next, the case, in which no page is found in the page absence decision at the Step 53305, will be described with reference to FIG. 10(b). In this case, it is decided whether said input request is the one-page input request or the block input request (at Step 53318). In the case of the block input request, the page range information for the block input from the external storage device 4 is generated (at Step 53319) so that the page searches are repeated till the end of the retrieval range. In the case of the one-page in-put request, on the other hand, whether or not the locality set size is exceeded is decided in dependence upon whether or not the assigned buffer number in the requested locality set size is equal to the locality set size (at Step 53320). In case the locality set size is exceeded, the control is transferred to the secondary buffer management module 534 so as to change the chain to the secondary buffer management module 534 by the replacement algorithm of said locality set (at Step 53321). After this or in case the locality set size is not exceeded, it is decided whether or not the free buffer exists (at Step 53322). In the presence of the free buffer, the control is transferred to the free buffer management module 535 so as to secure only a one-plane buffer from the free buffer chain thereby to connect the secured buffer to said requester's locality set (at Step 53323). In the absence of the free buffer, it is decided whether or not the secondary buffer exists (at Step 53324). In the presence of the secondary buffer, one plane of the buffer is secured by the replacement algorithm of the secondary buffer, and the control is transferred to the secondary buffer management module 534 so as to connect the buffer secured in said requester's locality set (at Step 53325). In the absence of the free buffer or the secondary buffer, i.e., in the case of buffer shortage, the buffer is acquired from the expanded I/O buffer. First of all, the buffer for the replacement is searched from the locality set by the replacement algorithm of said requester's locality set (at Step 53326). Then, the control is transferred to the free buffer management module 535, and only one plane of the buffer is secured from the expanded I/O buffer to connect the buffer secured in said requester's locality set (at Step 53327). After this, the page of the buffer selected at the Step 53326 is saved to the secured expanded I/O buffer (at Step 53328) to use the buffer having the saved page for the page input from the external storage device 4. In the case of the one-page input request, the control is transferred to one-page I/O processing unit 538 so as to input the page to the page input buffer from the database 40 on the external storage device 4 after all of the processings (at Step 53329).

Next, the output is requested in the decision (of the Step 53300) in the processing of the locality set management module 533 of FIG. 10(a) upon whether or not the request for the locality set management module 533 is the output request. In this case, it is decided whether or not said output request is that for the block output (at Step 53314), as shown in FIG. 10(b). In the case of the request for the block output, the control is transferred to the block I/O processing module 539 (at Step 53315) so that the page of the existence of all the output requests in the locality set may be written in group in the database 40 of the external storage device 4. In case said output request is not the block one, i.e., in the case of the one-page output request, the output request flag is set on the page management table 65 of the page to be requested for the output, and the page for the I/O buffer of said page is fixed on the main memory 2 (at Steps 53316 and 53317).

Figure 12:
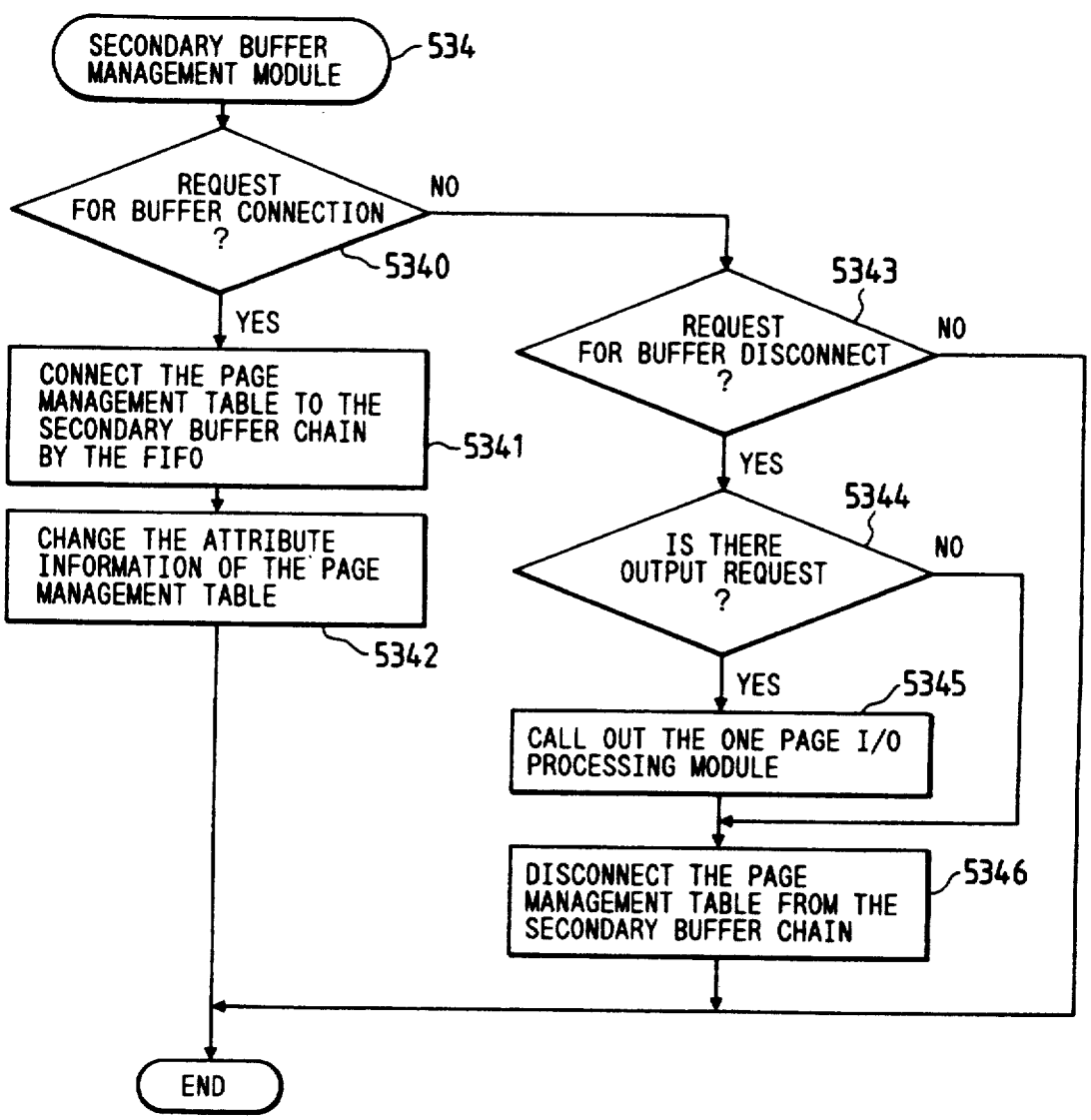
FIG. 12 is a processing flow chart showing the secondary buffer management module of FIG. 5.

FIG. 12 is a processing flow chart of the secondary buffer management module in the present invention.

In the secondary buffer management module 534, it is decided whether or not the request is for the buffer connection to the secondary buffer chain (at Step 5340). In case the request is for the connection, the page management table 65 requested is connected to the secondary buffer chain by the replacement algorithm FIFO of the secondary buffer (at Step 5341). If the connection is ended, the attribute information (e.g., the locality set ID) of the page management table 65 is changed (at Step 5342). In case, on the other hand, the request is not for the buffer connection to the secondary buffer chain, it is decided whether or not the request is for the buffer disconnection from the secondary buffer chain (at Step 5343). In the case of the request for the buffer disconnection, it is decided whether or not there is a request for the output to the database 40 of the external storage device 4 for the page of the buffer to be disconnected (at Step 5344). In the presence of the output request, the control is transferred to the one-page I/O processing module 538 for the output to the database 40 of the external storage device 4 (at Step 5345). Moreover, if the processing of the output request of said buffer is ended or in the absence of the output request, the page management table 65 of said buffer is disconnected from the secondary buffer chain (at Step 5346).

Figure 13:
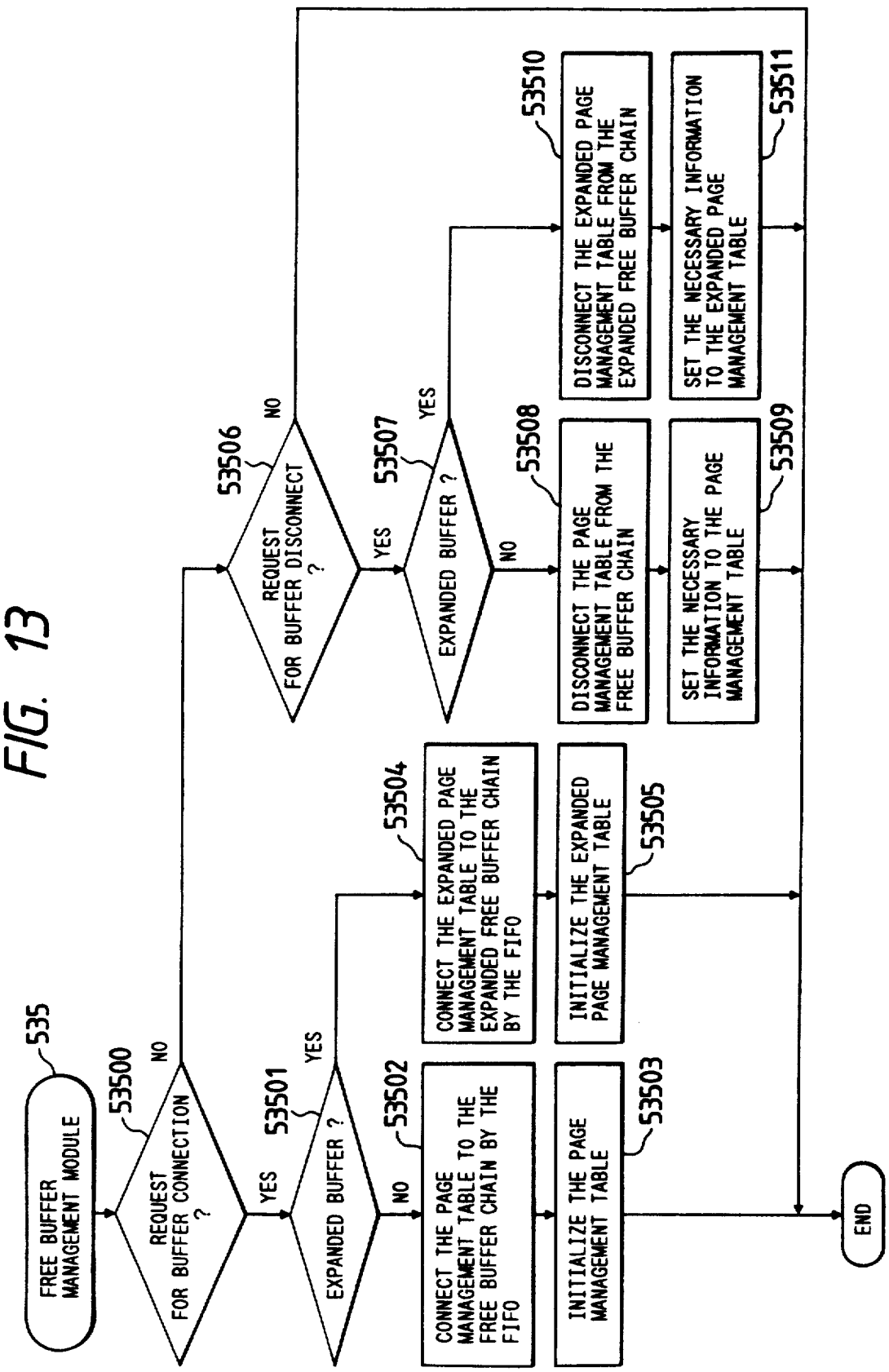
FIG. 13 is a processing flow chart showing the free buffer management module of FIG. 5.

FIG. 13 is a processing flow chart of the free buffer management module in the present invention.

In the free buffer management module 535, it is decided whether or not the request is for the buffer connection to the free buffer chain (at Step 53500). In the case of the request for the connection, it is decided whether or not said connection request buffer is the expanded I/O buffer (at Step 53501). In the case out of the expanded I/O buffer, i.e., in the case of the I/O buffer on the virtual space 5, the page management table 65 required for the free buffer chain is connected by the replacement algorithm FIFO of the free buffer (at Step 53502). By this connection, the information such as the attribute information of said page management table 65 is initialized (at Step 53503). In case said request for the connection is the expanded I/O buffer, on the other hand, the expanded page management table 67 requested for the expanded free buffer chain is connected by the replacement algorithm FIFO like the Steps 53502 and 53503 so that the information such as the attribute information of the expanded page management table 67 is initialized (at Steps 53504 and 53505). In the case out of the request for the buffer connection to the free buffer chain, on the other hand, it is decided whether or not the request for the buffer disconnection from the free buffer chain (at Step 53506). In the case of the request for the buffer disconnection, it is decided whether or not the buffer to be disconnected is the expanded I/O buffer (at Step 53507). In case said request for the disconnection is not the expanded I/O buffer 30 but the I/O buffer 68 on the virtual space 5, the page management table 65 of the buffer to be disconnected is disconnected from the free buffer chain (at Step 53508). After this, the requester's information is set to the disconnected page management table 65 (at Step 53509). In case said request for the connection is the expanded I/O buffer 30, on the other hand, the expanded page management table to be disconnected is disconnected from the expanded free buffer chain like the Steps 53508 and 53509, and the requester's information is set to the expanded page management table 67 disconnected (at Steps 53510 and 53511).

Figure 14:
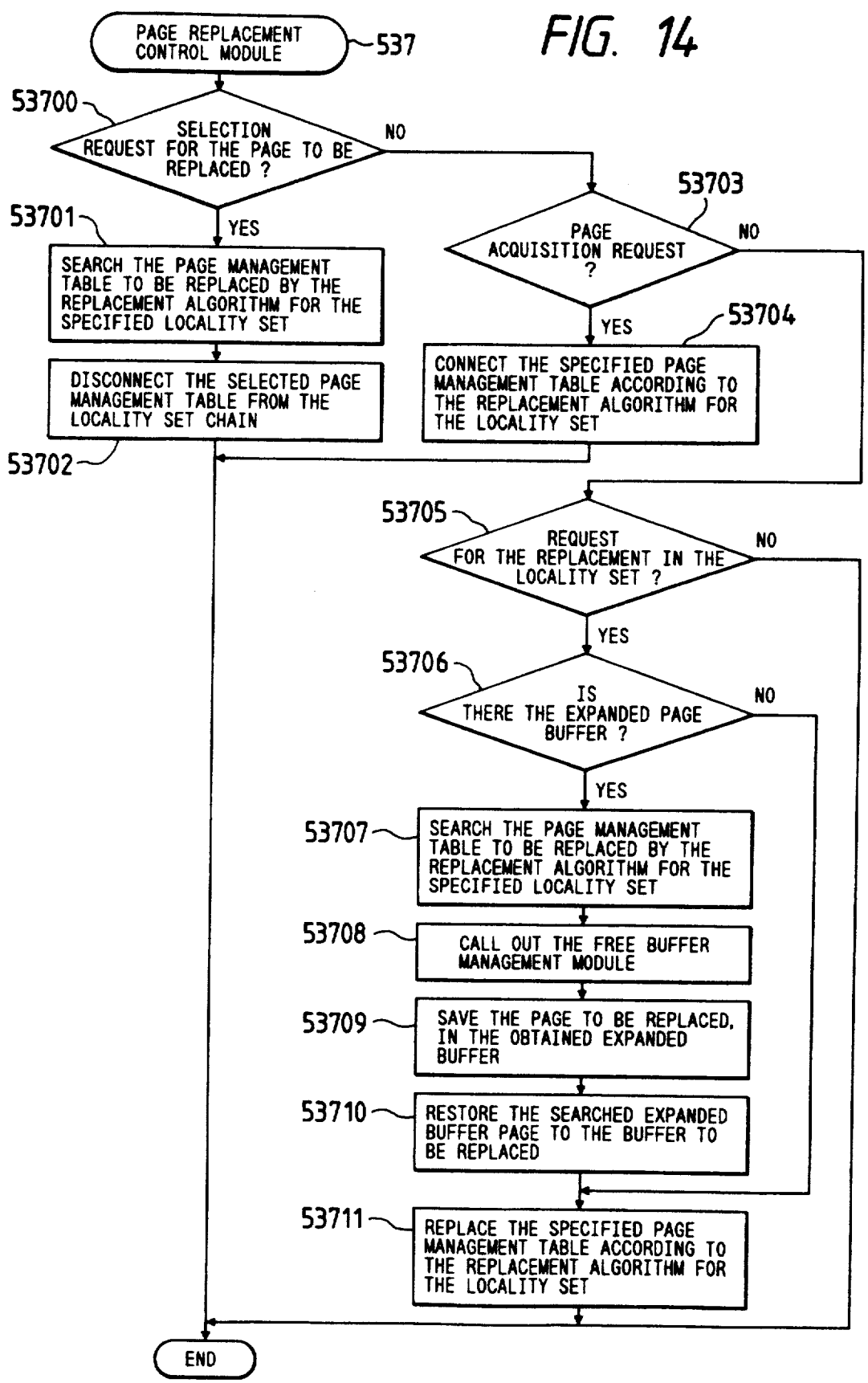
FIG. 14 is a processing flow chart showing the page replacement control module of FIG. 5.

FIG. 14 is a processing flow chart of the page replacement control module in the present invention.

In the page replacement control module 537, it is decided at first whether or not the request is a selection request for the page to be replaced from the locality set (at Step 53700). In case the request is the selection request, the page management table 65 of the page to be replaced by the replacement algorithm of said locality set is searched from the specified locality set (at Step 53701). Then, the selected page management table 65 is disconnected from the chain of the specified locality set (at Step 53702). In case the request is not the selection request, it is decided whether or not the request is the page acquisition request in the locality set (at Step 53703). In the case of the page acquisition request, the specified page management table 65 is connected according to the replacement algorithm for the specified locality set (at Step 53704). If the request is not the page acquisition request, on the other hand, it is decided whether or not the request is one for the replacement of the specified page in the locality set (at Step 53705). In the case of the request for the replacement in the locality set, it is decided whether or not the requested page is the expanded I/O buffer 30 (at Step 53706). In the case of the expanded I/O buffer 30, the page management table 65 of the page to be replaced is searched by the replacement algorithm of the specified locality set (at Step 53707). Next, the control is transferred to the free buffer management module 535 so as to get the buffer for saving the page to be selectively replaced from the expanded I/O buffer 30 (at Step 53708). Then, the page to be replaced is saved to the expanded I/O buffer 30 obtained, and the information of the page management table 65 of the saved page is transferred to the expanded page management table 67 of the expanded I/O buffer saved (at Step 53709). Then, the page of the expanded I/O buffer 30 to be replaced in said locality set is restored to the I/O buffer of the saved page (at Step 53710). After this, if other than the expanded page buffer or when the restoration of the expanded page buffer is ended, the page management table 65 specified by said request has its chain replaced in accordance with the replacement algorithm of the locality set (at Step 53711).

Figure 15:
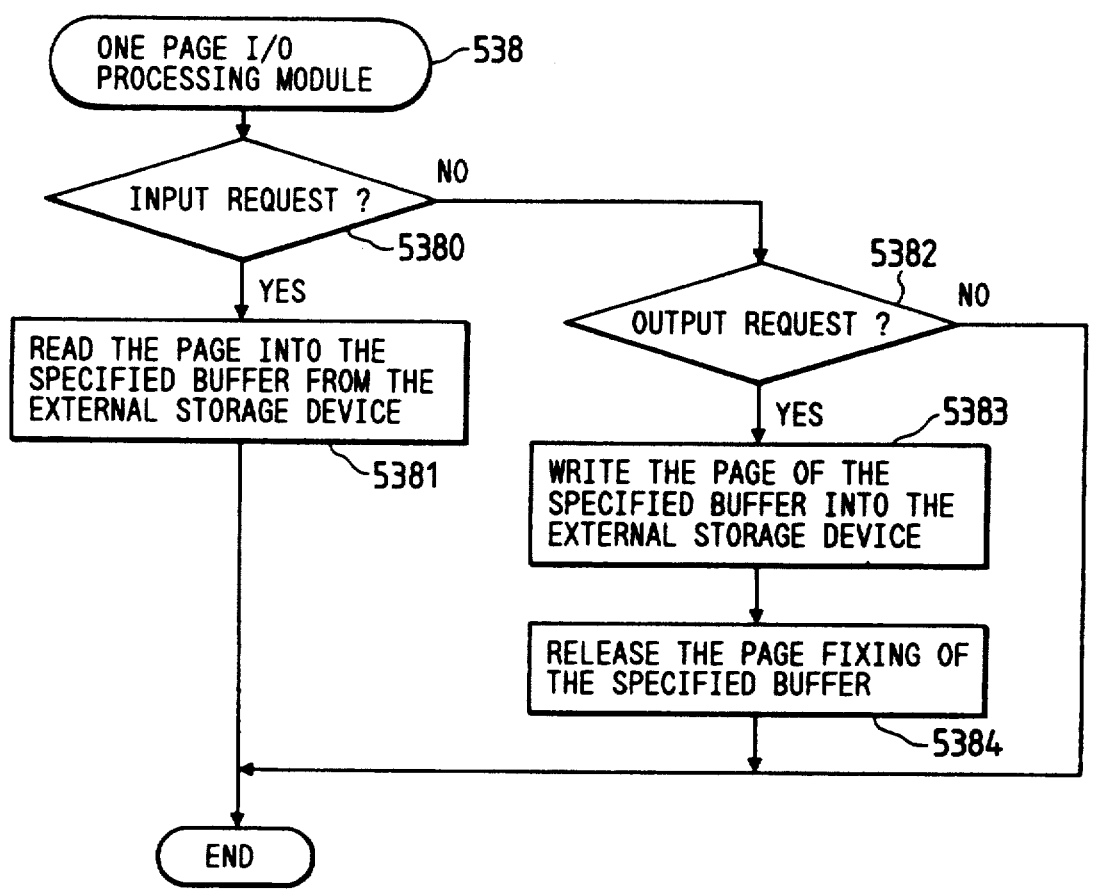
FIG. 15 is a processing flow chart showing the one-page I/O processing module of FIG. 5.

FIG. 15 is a processing flow chart of the one-page I/O processing module in the present invention.

First of all, it is decided whether or not the processing request to said one-page I/O processing module 538 is an input request (at Step 5380). In the case of the input request, the page is read into the specified buffer from the database 40 of the external storage device 4 (at Step 5381). In case the request is not the input request, on the other hand, it is decided whether or not the request is the output request (at Step 5382). In the case of the output request, the page of the specified buffer is written at first into the database 40 of the external storage device 4, and the page fixing of the main memory 2 of the specified buffer is released (at Steps 53383 and 53384).

Figure 16:
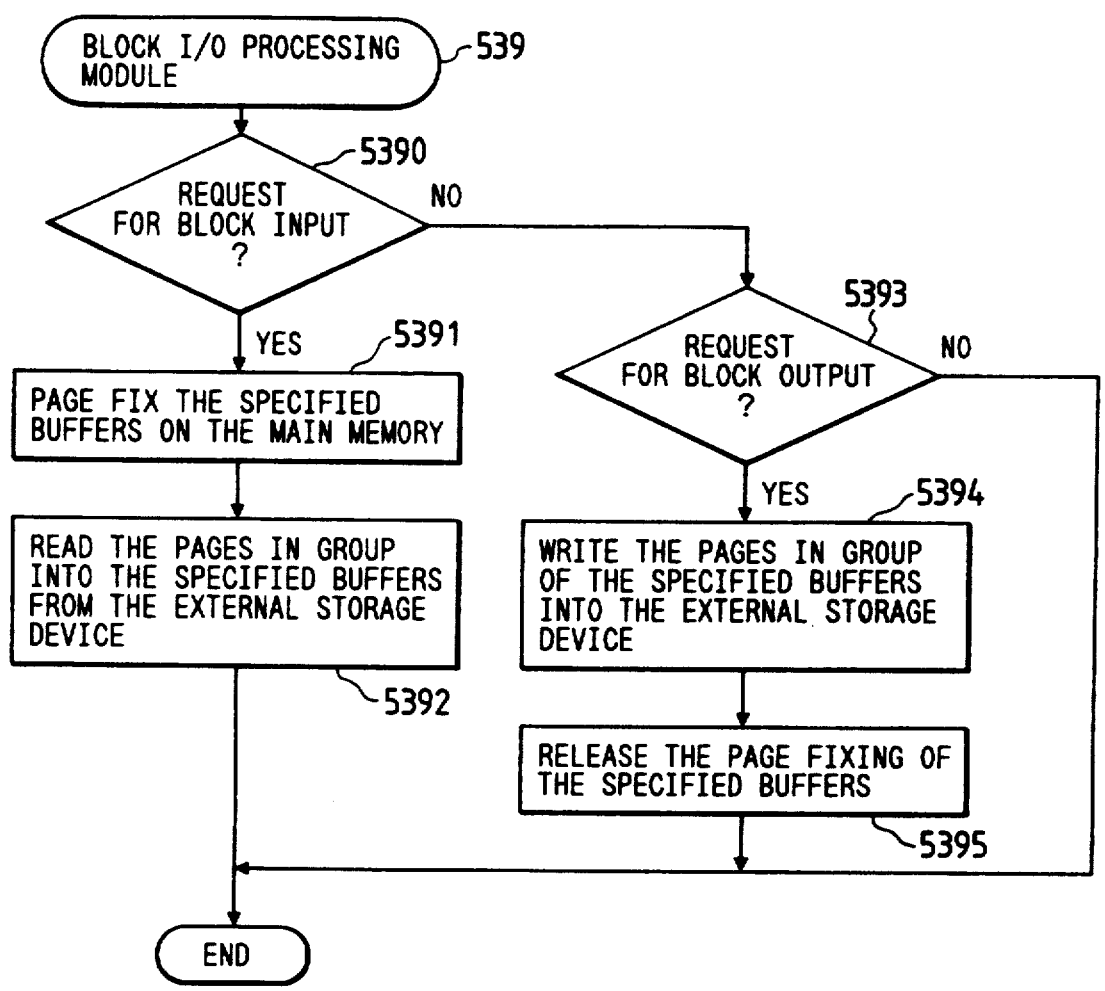
FIG. 16 is a processing flow chart showing the block I/O processing module of FIG. 5.

FIG. 16 is a processing flow chart of the block I/O processing module in the present invention.

Figure 10C:
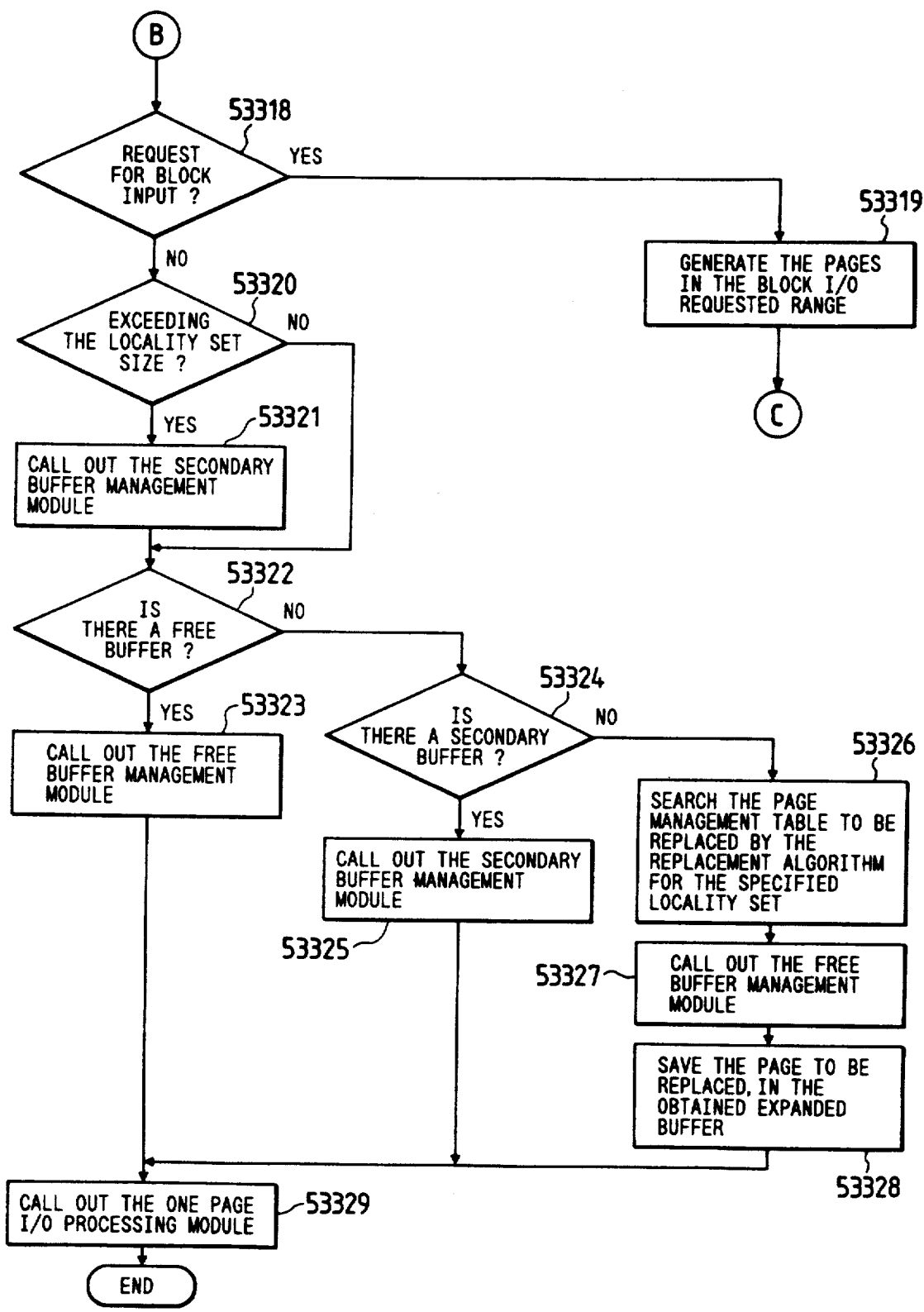

First of all, it is decided whether or not the processing request to said block I/O processing module 539 is the block input request (at Step 5390). In the case of the block input request, the pages of the buffer group specified for the pre-read are fixed on the main memory 2, and the page fixing flags of the page management table 65 of the buffer group are set on (at Step 5391). Then, the pages in the block input request page range information (which should be referred to the Step 53319) generated in the processing flow of FIG. 10 are read in group into I/O buffer group specified from the database 40 of the external storage device 4 (at Step 5392). In case the request is not the block input request, on the other hand, it is decided whether or not the request is the block output request (at Step 5393). In the case of the block output request, the pages of the I/O buffer group specified by the database 40 of the external storage device 4 are written in group, and the page fixing of the specified buffers on the main memory 2 is released (at Steps 5394 and 5395).

Thus, the buffer management method of the first embodiment has been described hereinbefore.

Next, second to fourth embodiments of the present invention will be described in the following.

Figure 17:
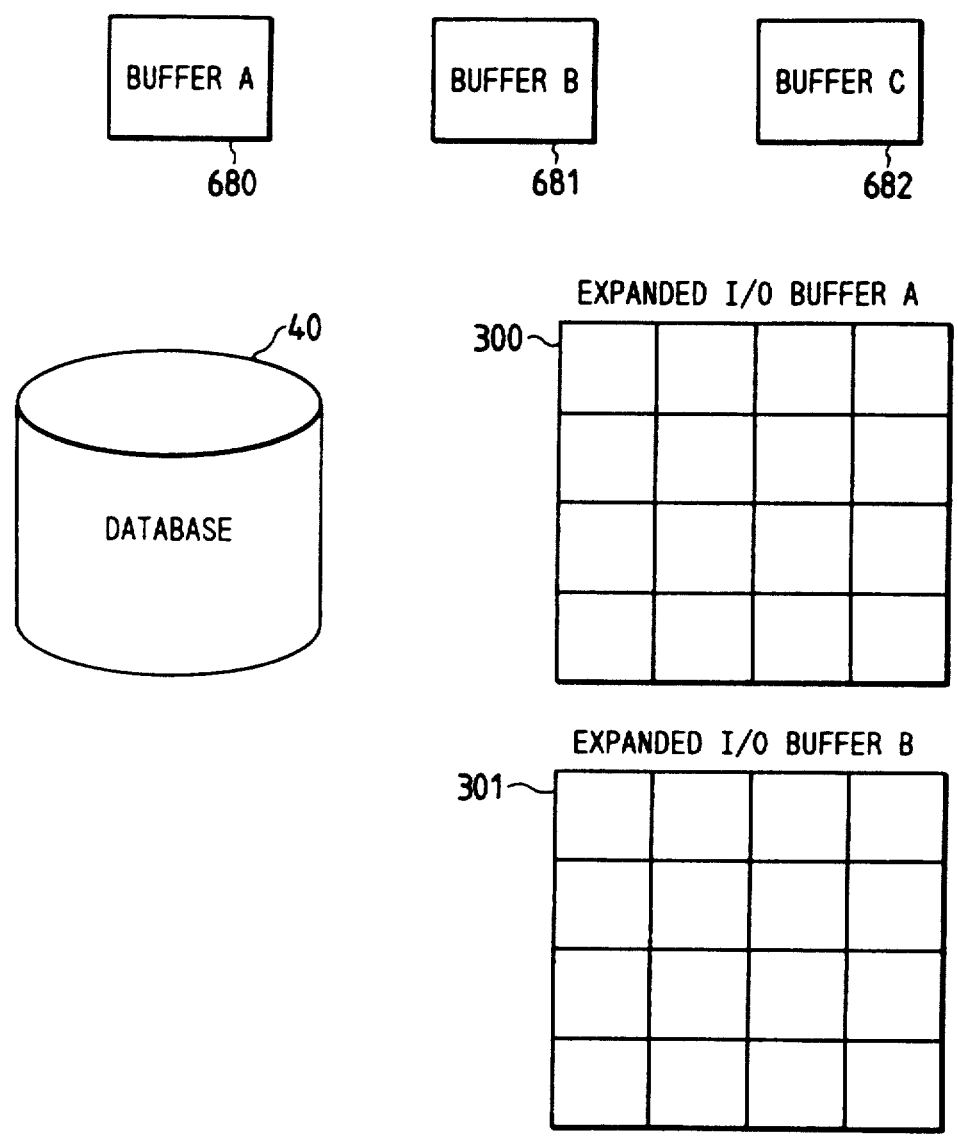
FIG. 17 is an explanatory diagram showing a second embodiment of the present invention.

FIG. 17 is an explanatory diagram showing the buffer management method according to the second embodiment of the present invention.

This second embodiment also has the overall structure of the computer system, as shown in FIG. 1, but has its operations made different from those of the first embodiment.

What will be described in the following is the processings in case the database processing module 52 of the database management system 50 prepares an intermediate file by the sort merging method in response to a query.

First of all, the database processing module 52 requests the I/O buffer management module 53 for the securements of buffers of three pages (i.e., a buffer (A) 680, a buffer (B) 681 and a buffer (C) 682) on the virtual space 5, and an intermediate file storing expanded I/O buffer (A) 300 and an expanded I/O buffer (B) 301 on the expanded memory 3, as shown in FIG. 17, to get the individual buffers. Moreover, a page is inputted from the database 40 to the buffer (A) 680, and the data in the inputted page are processed and written in the buffer (C) 682. The inputting is continued till all the pages are read from the database 40 into the buffer (A) 680. If the buffer (C) 682 is fully occupied during the reading, the data are saved in the expanded I/O buffer (A) 300.

Next, two pages are restored from the intermediate file, which has been saved in the expanded I/O buffer (A) 300, to the buffer (A) 680 and the buffer (B) 681, and the sort-merged results are written in the buffer (C) 682. When the buffer (C) 682 is fully occupied by the sort-merged results, the content of the buffer (C) 682 is saved in the expanded I/O buffer (B) 301. These operations are repeated for the intermediate file of the expanded I/O buffer (A) 300 till the sort merging is ended. In these ways, the expanded I/O buffer (A) 300 and the expanded I/O buffer (B) 301 are alternately used for the restoration or saving till the sort merging is ended.

Next, the buffer management method according to the third embodiment of the present invention will be described in the following.

Figure 18:
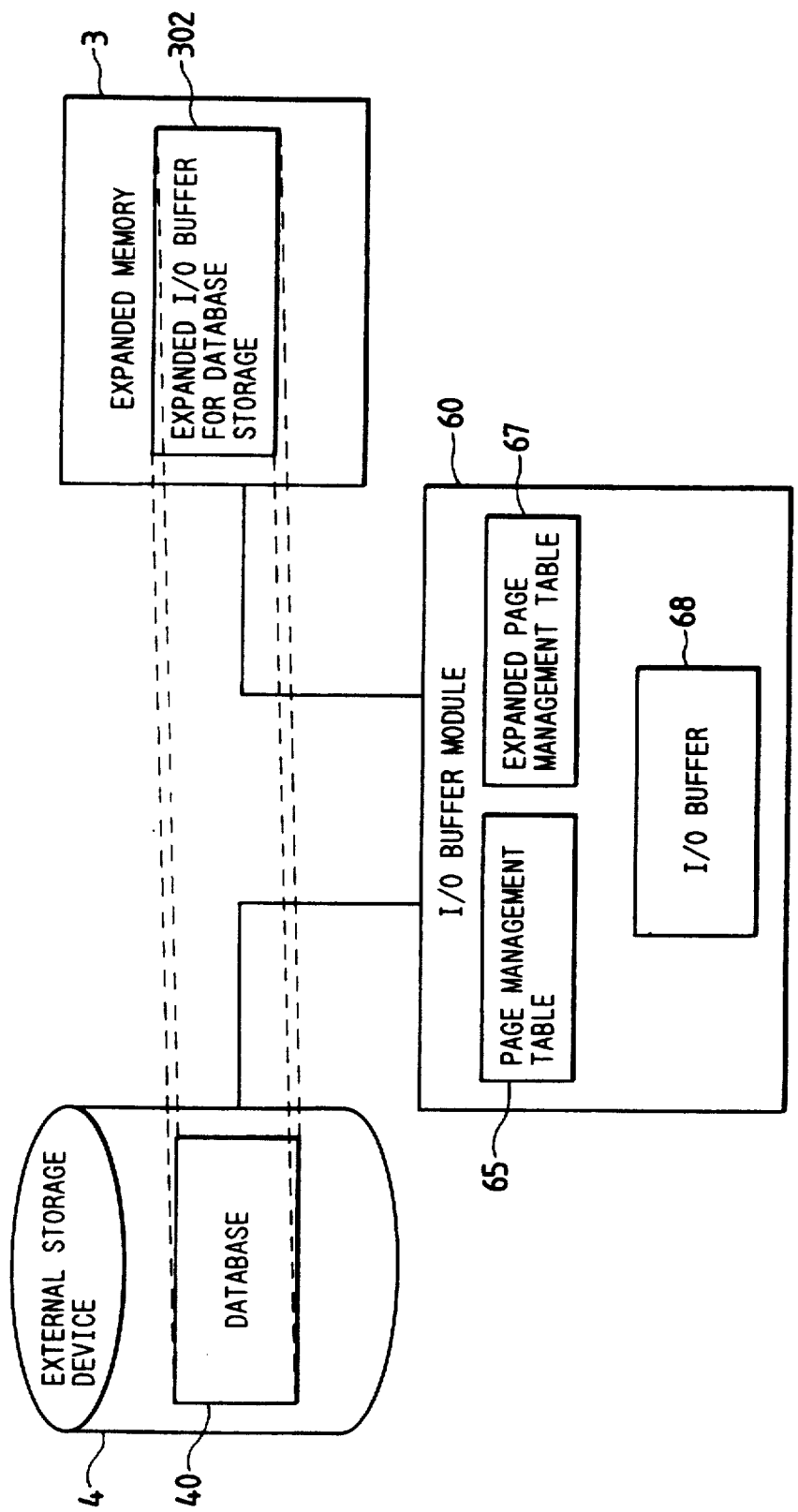
FIG. 18 is a diagram showing the relations between the arrangement of a database and an I/O buffer module according to a third embodiment of the present invention.

FIG. 18 is a diagram showing the relations between the arrangement of the database and the I/O buffer module according to the third embodiment of the present invention.

In the third embodiment, too, the overall structure of the computer system is identical to that shown in FIG. 1.

The I/O buffer module 60 is equipped with: a page management table 65 having the location informations and page informations of the individual buffers of the I/O buffer 68; and an expanded page management table 67 having the location informations and page informations of the individual buffers as to the database storing expanded I/O buffer 30 secured on the expanded memory 3. The expanded I/O buffer 302 on the expanded memory has a capacity capable of storing the database 40.

The application of the present embodiment is exemplified by the internal processing case in which the intermediate file by the sort merging method is prepared in response to a query of the user. In this case, the minimum buffers required simultaneously in the sort merging are secured in the I/O buffer 68 on the main memory 2, and a first I/O buffer group area and a second buffer group area for storing the intermediate file are retained in the database storing expanded I/O buffer 302 on the expanded memory 3.

At the initial stage, the data are read from the database 40 of the external storage device 4 in the I/O buffer 68 of the I/O buffer module 60 so that they may be sorted. After this, the sorted intermediate file is saved in the first buffer group on the expanded memory 3. At the next stage, the data are restored from the first buffer group on the expanded memory to the I/O buffer 68 of the I/O buffer module 60 so that they may be merged. After this, the merged intermediate file is saved in the second buffer group on the expanded memory 3. These processings are repeated to input/output the data till the end of the merging by alternately using the first and second buffer groups on the expanded memory.

Another application is exemplified by the saving and restoration in case the hysteresis information management buffer in the database management system is fully occupied by the informations.

Specifically, in case the I/O buffer 68 of the I/O buffer module 60 is the hysteresis information management buffer in the database management system, the hysteresis informations are wholly or partially saved, when they fully occupy the buffer secured on the I/O buffer 68, into the database storing expanded I/O buffer 302 on the expanded memory 3. After this, in the database restoration when the system is troubled, the hysteresis informations saved in the I/O buffer 302 on the expanded memory 3 are restored to the I/O buffer 68 on the main memory 2.

Still another application is exemplified by the saving and restoration in case the buffer capacity becomes short as the queries to the database are increased.

Specifically, the I/O buffer management module 53 of the database management system 50 executes the locality set management for dividing the I/O buffer 68 in response to each query to the database to determine the locality set replacement algorithm matching the accessing characteristics to the database inquired, to input/output the data. If the buffer for the locality set size cannot be secured from the I/O buffer 68 at the time of execution of the query, the buffer corresponding to the short size is secured from the expanded memory 3. In case the data exceeding the size secured in the I/O buffer 68 of the main memory 2 are to be inputted, the data page to be replaced by the replacement algorithm of the locality set is saved in the I/O buffer 302 on the expanded memory 3 so that the data are inputted to the I/O buffer 68 on the main memory 2 to have its page replaced.

Figure 19:
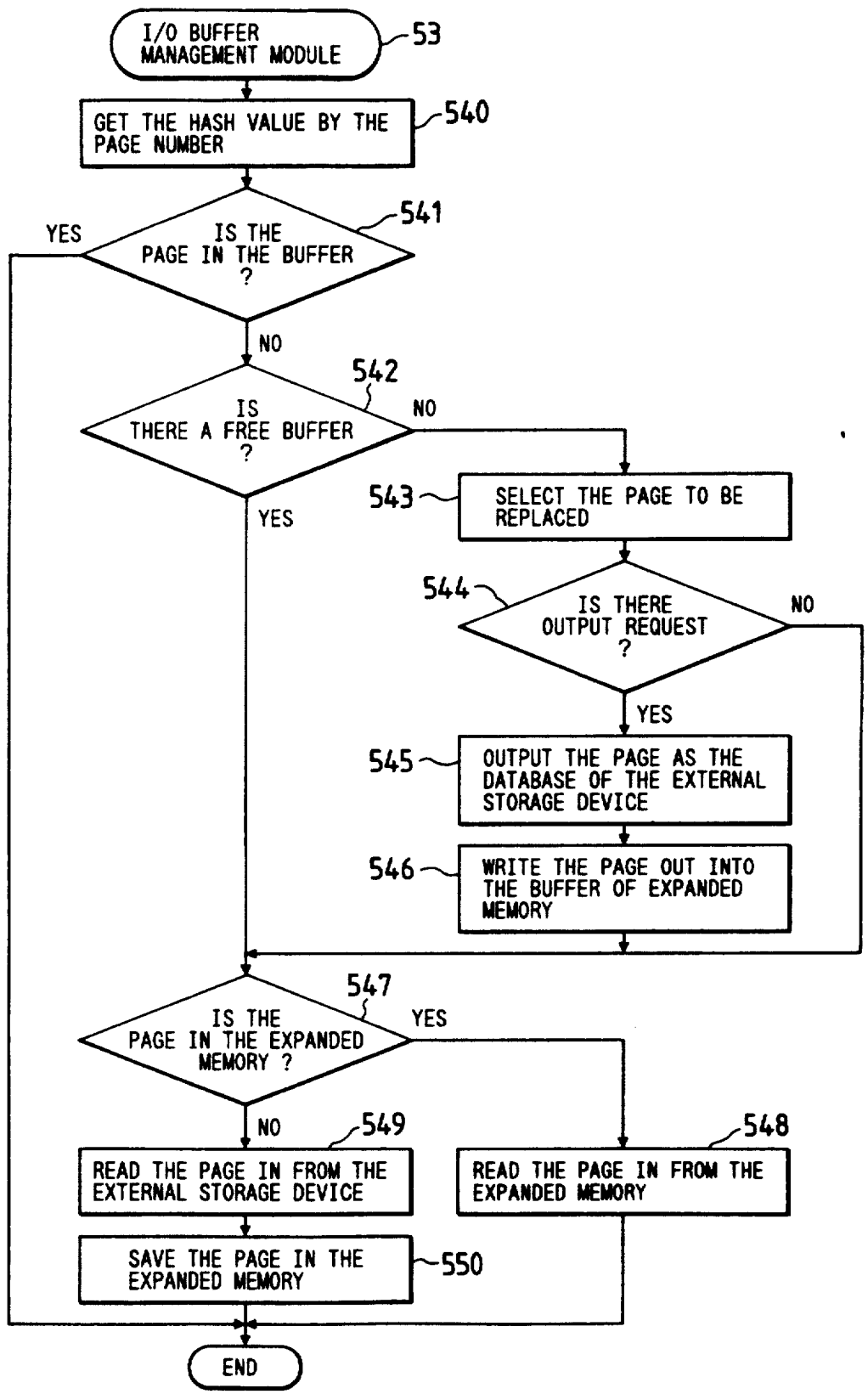
FIG. 19 is a processing flow chart showing the I/O buffer management module according to the second embodiment.

FIG. 19 is a processing flow chart showing the I/O buffer management module of FIG. 1.

In the I/O buffer management module 53, as to the page requested to be inputted, a certain hash function is used at first to get a hash value by the page number (at Step 540). The I/O buffer 68 is searched by the got hash value to decide whether or not said input requested page exists on the I/O buffer 68 (at Step 541), and whether or not a free buffer exists is decided in case said requested page is not on the I/O buffer 68 (at Step 542). In case no free buffer exists, the page to be replaced is selected by the replacement algorithm of said I/O buffer management module 53 (at Step 543). Then, whether or not an output request is for the selected page is decided (at Step 544). If the output request exists, said page is outputted to the database 40 on the external memory 4 (at Step 545). Moreover, said page is write out into the storage location of the same data on the expanded I/O buffer 302 on the expanded memory 3 so that it may be updated (at Step 546). In these ways, said input request page is inputted to the page inputting buffer selected.

First of all, it is decided whether or not said input request page is already stored on the expanded I/O buffer 302 on the expanded memory 3 (at Step 547). If said input request page is on the expanded I/O buffer 302, said page on the expanded I/O buffer 302 is read in the buffer (at Step 548). In case, however, said page is not stored yet on the expanded I/O buffer 302, said page is read in from the database 40 of the external storage device 4 (at Step 549). Moreover, the read page is saved in the expanded I/O buffer 302 on the expanded memory 3 (at Step 550).

In the embodiment thus far described, moreover, the processings are executed at the database processing time in case the input request page is not in the expanded I/O buffer 302. At the start of the database management, however, the database storing I/O buffer 302 on the expanded memory 3 is initially loaded in block with the database 40 on the external storage device 4. Then, the processing (of the Step 547) for deciding whether or not the input request page of FIG. 19 is on the expanded memory 3 can be dispensed with to omit the Steps 549 and 550 accordingly.

In the third embodiment thus far described, the data I/O processing can be executed in the I/O buffer management module 53 by utilizing the I/O buffer 68 on the virtual memory space 5 and the expanded I/O buffer 302 on the expanded memory 3. By fixing the buffer to be requested for the output and the pre-reading buffer group in the main memory 2, moreover, the buffer management considering the virtual memory management of the operating system can be executed.

Next, the buffer management method according to the fourth embodiment of the present invention will be described in the following with reference to the accompanying drawings.

Figure 21:
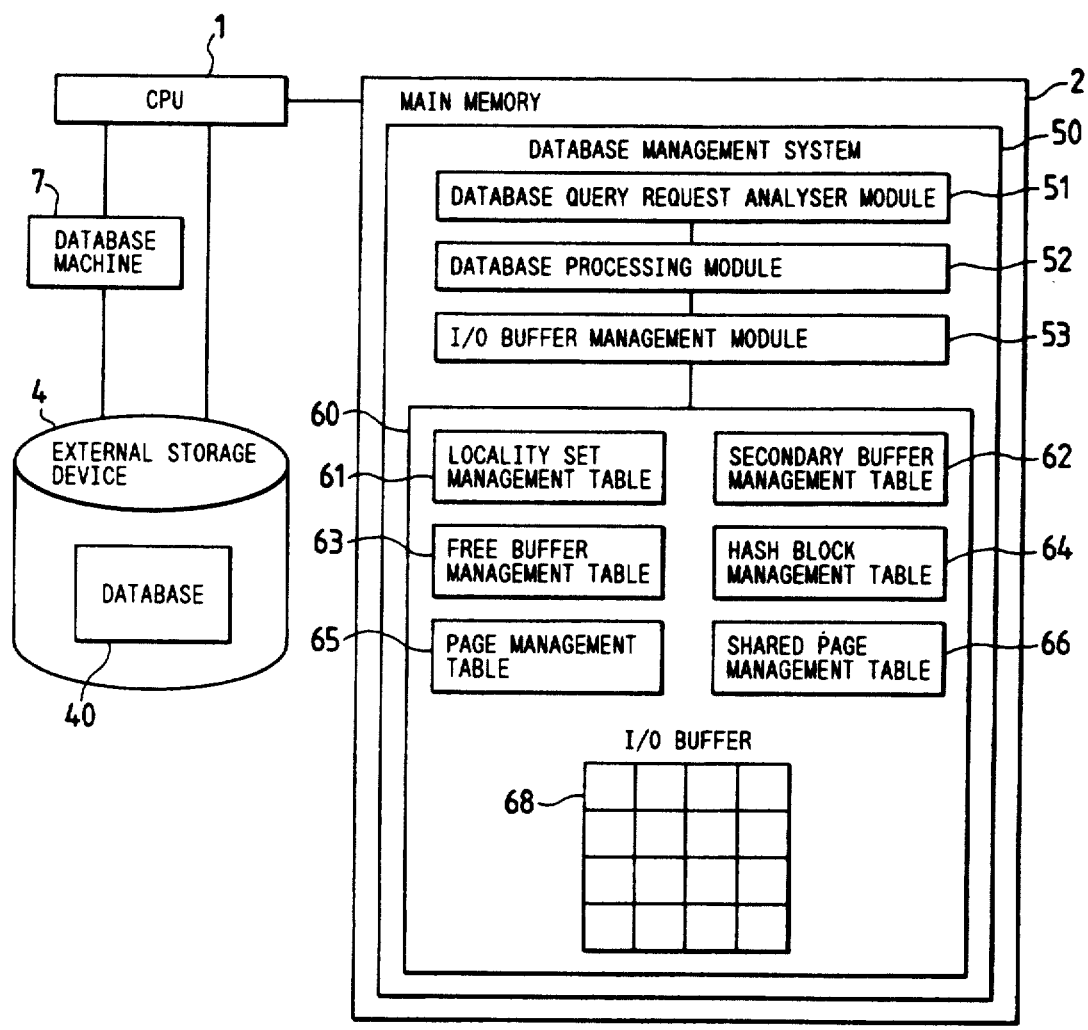
FIG. 21 is a block diagram showing the whole structure of a computer system to which is applied a buffer management method according to a fourth embodiment of the present invention.

FIG. 21 is a diagram showing the overall structure of the computer system according to the fourth embodiment of the present invention.

The structure of FIG. 21 is different from that of FIG. 1 in that the expanded memory 3 and an I/O buffer module 6 are not equipped with the expanded page management table, and in that a database machine 7 is connected between the CPU 1 and the external storage device 4. The database management system 50 on the main memory 2 is equipped with: a database query request analyser module 51 for analysing the syntax and meaning of a database query request coming from a user; a database processing module 52 for executing database processings such as selections or joins in accordance with internal processing procedures inquired by determining the processing procedures; an I/O buffer management module 53 for managing the I/O buffer group, which latches the data of the database 40 stored in the external storage device 4, in response to the I/O processing request of the data from the database processing module 52; and an I/O buffer 68 necessary for buffering the data of the database 40; and an I/O buffer module 60 having a table for managing the I/O buffer 68. Specifically, the database management system 50 and the I/O buffer module 60 are provided at an equivalent level in the first embodiment, as shown in FIG. 1. In the fourth embodiment, however, the I/O buffer module 60 is included in the database management system 50.

In a relational database, the data are constructed of a logical data structure called the "relation" which is composed of a plurality of tuples. This relation is divided into a plurality of those pages having a physically fixed length or the I/O unit of the database management system 50, which are stored in the database 40 of the external storage device 4.

The I/O buffer module 60 is composed of: a locality set management table 61 for managing the locality set, which is divided from the buffer for each relation to access in response to the database query request from the user; a secondary buffer management table 62 for managing a secondary buffer belonging to none of the locality set by latching the page which is expelled from the locality set by the replacement algorithm of the locality set after the end of the database query request processing; a free buffer management table 63 for managing a free buffer having no page yet and an I/O buffer on the expanded memory; a hash block management table 64 for managing the chain of buffers as a result of the hashing in the case of a buffer search in response to an I/O request from the database processing module; a page management table 65 for latching the location information on the main memory 2, page number and status as dictating which locality set, secondary buffer or free buffer is belonged to of each buffer on the virtual space for storing the pages; a shared page management table 66 for managing the page in case the page is shared among a plurality of locality sets; and an I/O buffer 68 on the virtual space for storing the pages of the database.

Figure 22:
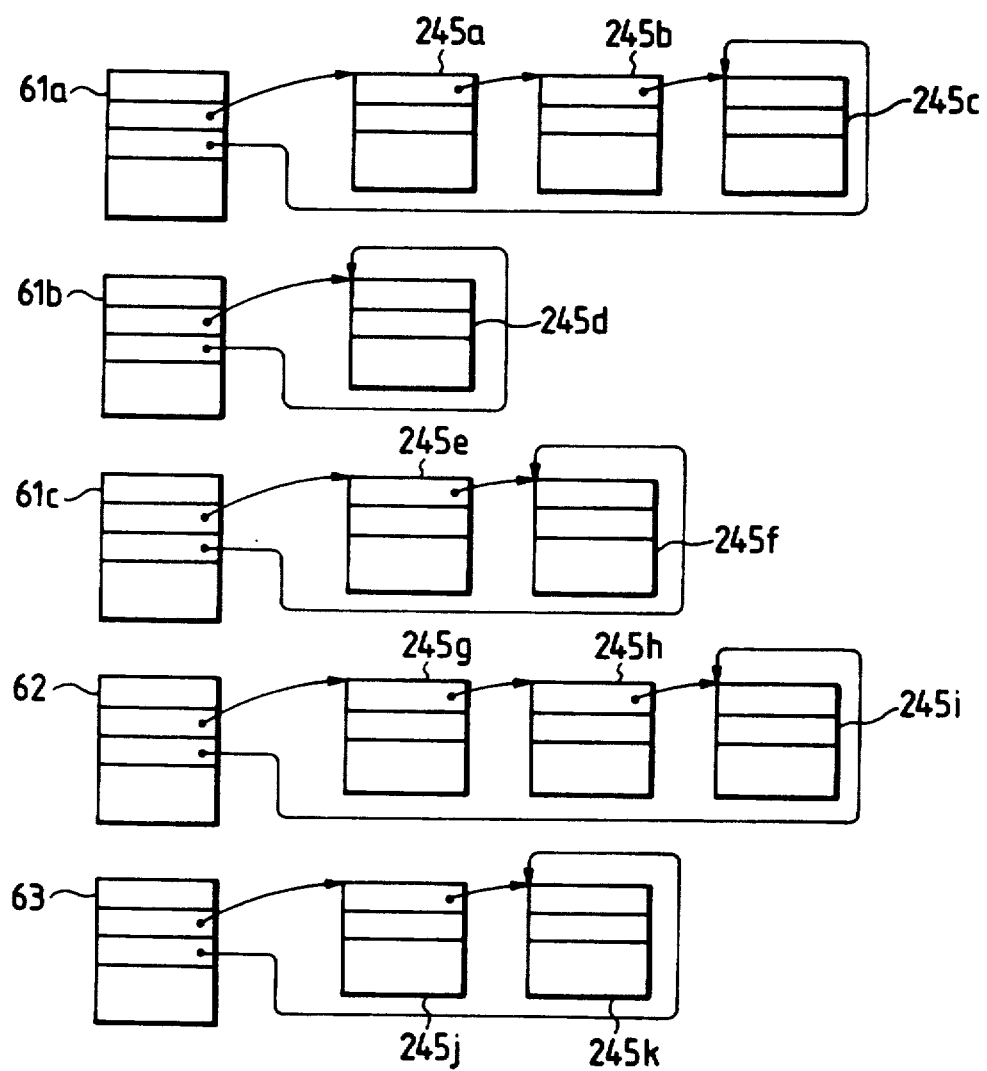
FIG. 22 is a diagram showing the relations among the individual management tables of the I/O buffer module of FIG. 21.

FIG. 22 is a relation diagram showing the individual management tables in the I/O buffer statuses of the I/O buffer module of FIG. 21.

The status of the I/O buffer is indicated in relation to the locality set management table 61, the secondary buffer management table 62 and the free buffer management table 63. Here are assumed three locality sets which are individually managed by locality set management tables 245a, 245b and 245c. Three data pages are read in the locality set management table 61a. Moreover, the page management tables 245a, 245b and 245c are chained by the replacement algorithm of said locality sets. On the other hand, one data page is read in the locality set management table 61b, and a page management table 245d is chained by the replacement algorithm of said locality set. On the other hand, two data pages are read in the locality set management table 61c, and page management tables 245e and 245f are chained by the replacement algorithm of said locality sets.

On the other hand, three data pages belonging to none of the locality sets are read as the secondary buffer in the secondary buffer management table 62, and page management tables 245g, 245h and 245i are chained by the replacement algorithm FIFO of the secondary buffer. On the other hand, two planes of free buffers are as the free buffer in the free buffer management table 63, and page management tables 245j and 245k are chained by the free buffer replacement algorithm FIFO.

Figure 23:
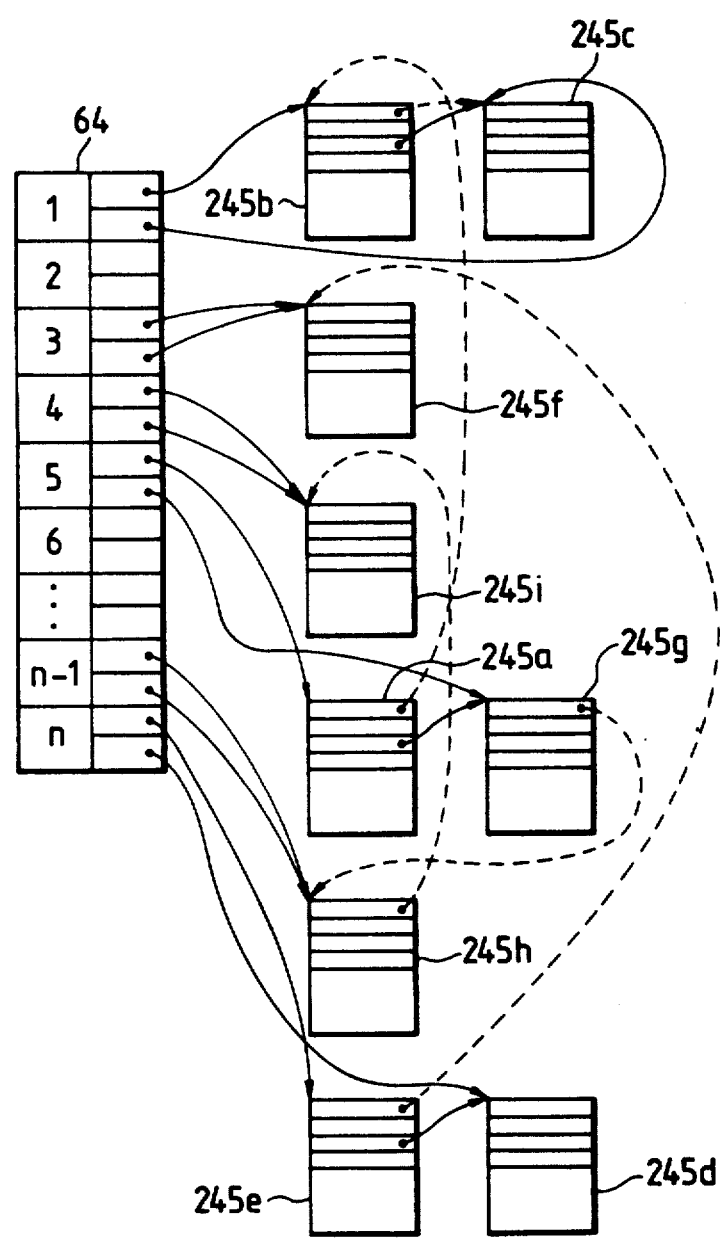
FIG. 23 is a diagram showing the relations between the hash block management table and the I/O buffer of FIG. 21.

FIG. 23 is a diagram showing the relations between the hash block management tables and the I/O buffers.

The hash block management table 64 has buffer chain informations corresponding to the hash values of the number of said I/O buffers. The page management tables 245b and 245c shown in FIG. 22 are chained in the hash value 1 of the hash block management table 64. The page management table 245f is chained in the hash value 3; the page management table 245i is chained in the hash value 4; the page management tables 245a and 245g are chained in the hash value 5; the page management table 245h is chained in the hash value (n−1); and the page management tables 245e and 245d are chained in the hash value n, by the respective hash chain pointers. At this time, the individual buffer chains of the locality set management tables 241a to 241c of FIG. 22 are chained by the pointers, as indicated by dotted lines at the page management tables of FIG. 23.

Incidentally, the structure of the I/O buffer management module 53 shown in FIG. 21 will not be described because it is identical to that of the first embodiment shown in FIG. 5. Moreover, the I/O request analyser module 530 shown in FIG. 5 plays a role of analysing the I/O request to the database, which has been transferred from the database processing module 52 to the I/O buffer management module 53. The processing flow will not be described because it is identical to that of the first embodiment shown in FIG. 6. Moreover, the locality set securing processing module 531 of FIG. 5 plays an initializing role by analysing a query at the start of processing said query and by securing the locality set matching the accessing procedures determined. The processing flow will not be described because it is identical to that of the first embodiment shown in FIG. 7.

Figure 24A:
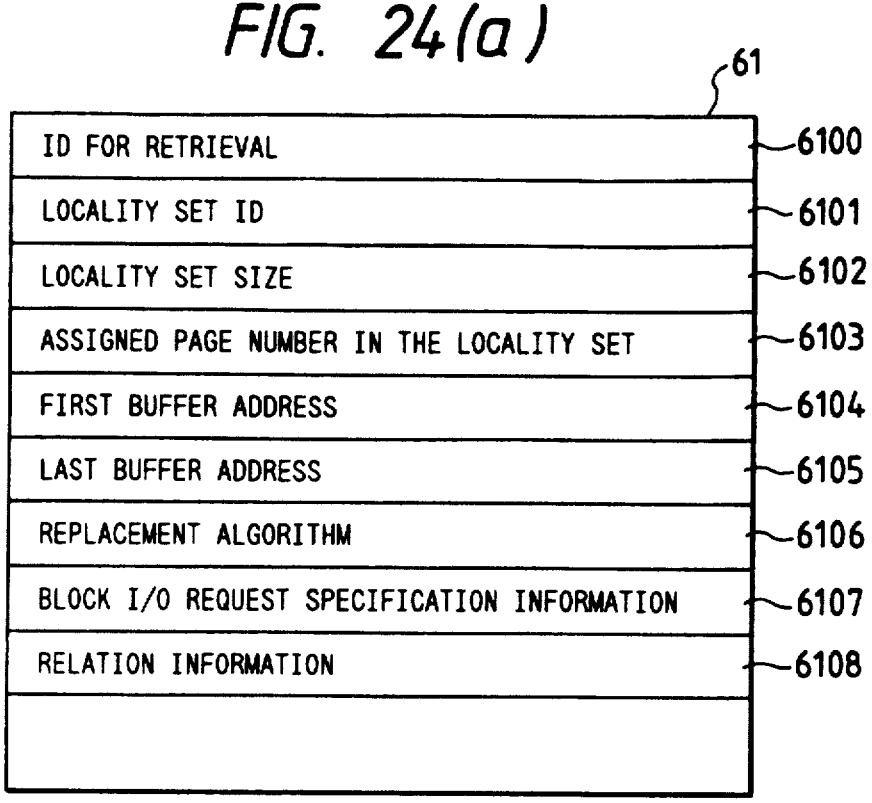
FIGS. 24(a) and 24(b) are diagrams showing the informations to be stored in the individual management table of FIG. 21.

FIG. 24(a) is a diagram showing the informations of the locality set management table 61 of the present embodiment.

This locality set management table 61 is stored with: an ID for retrieval 6100 to be discriminated the database machine, in case the database machine is to be used; a locality set ID 6101 for discriminating the locality set of each query at the I/O buffer management module 53; a locality set size 6102; an assigned page number 6103 in the locality set for offering the number of buffer planes assigned in the locality set by the query; first and last buffer addresses 6104 and 6105 for locating the first and last of the chain of the page management table for managing the buffers assigned to the locality set; a replacement algorithm 6106 for instructing a method of controlling the replacement of buffers in the locality set under consideration; a block I/O request specification information 6107 for specifying whether or not the query using the locality set under consideration is caused to perform the block input/output by the I/O buffer management module 53; and a relation information 6108 to be accessed to in response to said query.

Figure 24B:
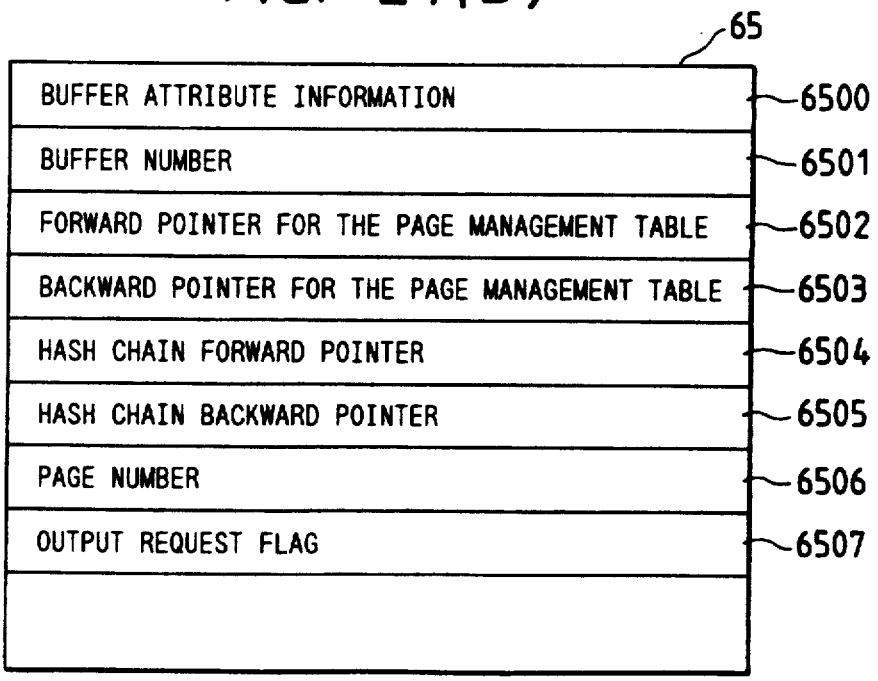

FIG. 24(b) is a diagram showing the informations of the page management table in the present embodiment.

This page management table 65 is stored with: a buffer attribute information 6500 such as an information for discriminating the relation as the locality set ID, i.e., the information relating to the aforementioned locality set and the information of the page to be managed by said page management table 65; a buffer number 6501 for discriminating the buffer under consideration; forward and backward pointers 6502 and 6503 for the page management table for locating the chain relations of a plurality of page management tables; hash chain forward and backward pointers 6504 and 6505 for locating the chain of the buffer belonging to the hash value which has been determined by a hash function for speeding up the page search; a page number 6506 managed by said page management table; and an output request flag 6507 for indicating whether or not an output request to the external storage device 4 is issued from the page managed by said page management table.

It is clearly found by comparing the structure of FIGS. 24(a) and 24(b) and the structure of FIGS. 8(a) and 8(b) of the first embodiment that the latter is different in failing to have the information concerning the expanded I/O buffer and the page fixing flag of the former.

Incidentally, the processing flow of the processing module 532 for setting the locality set free, in case the request for the I/O buffer management module 53 is to set the locality set free, will not be described because it is identical to that of the first embodiment shown in FIG. 9.

Figure 20A:
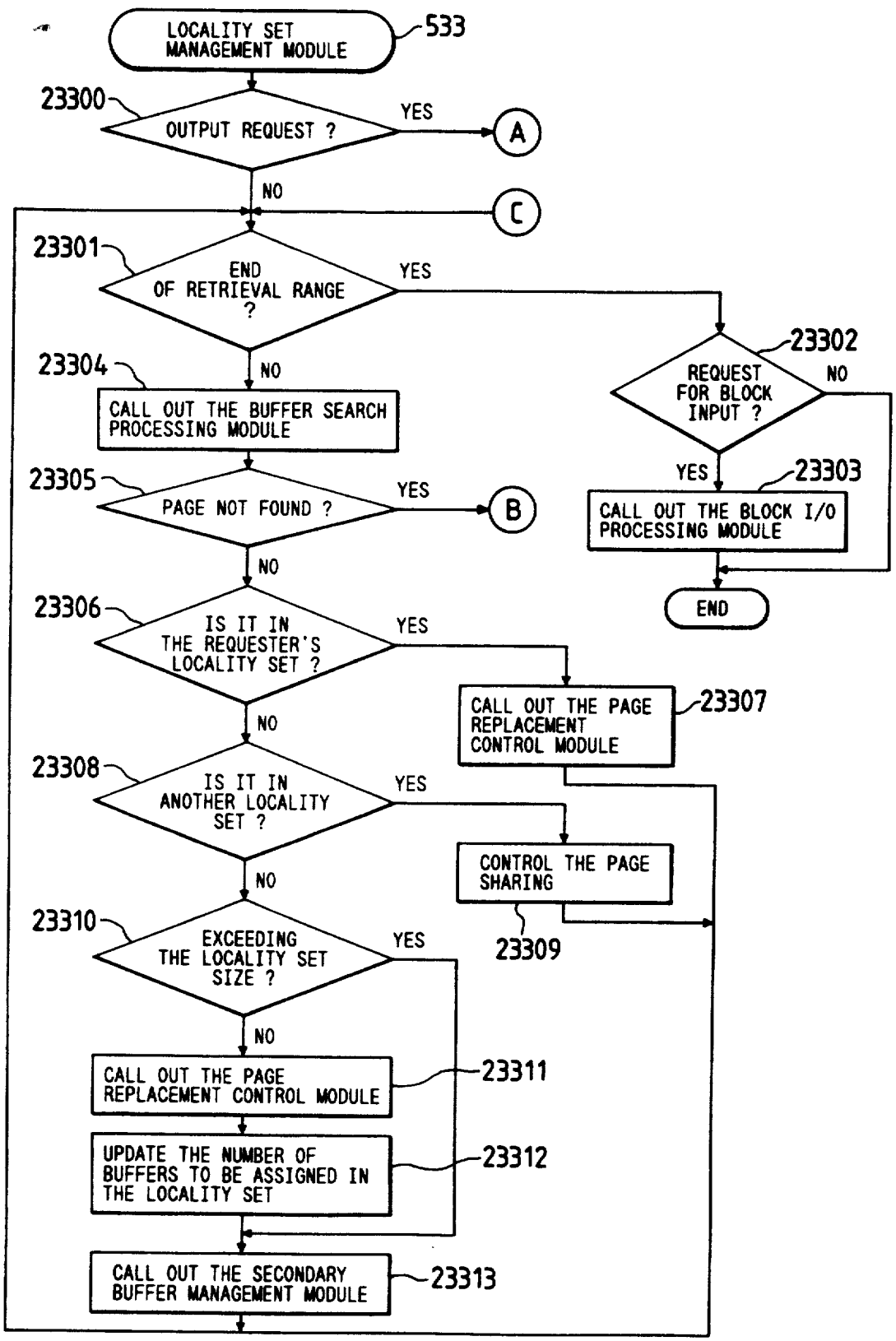
FIGS. 20(a), 20(b) and 20(c) are processing flow charts showing the locality set management module according to the second embodiment.
Figure 20B:
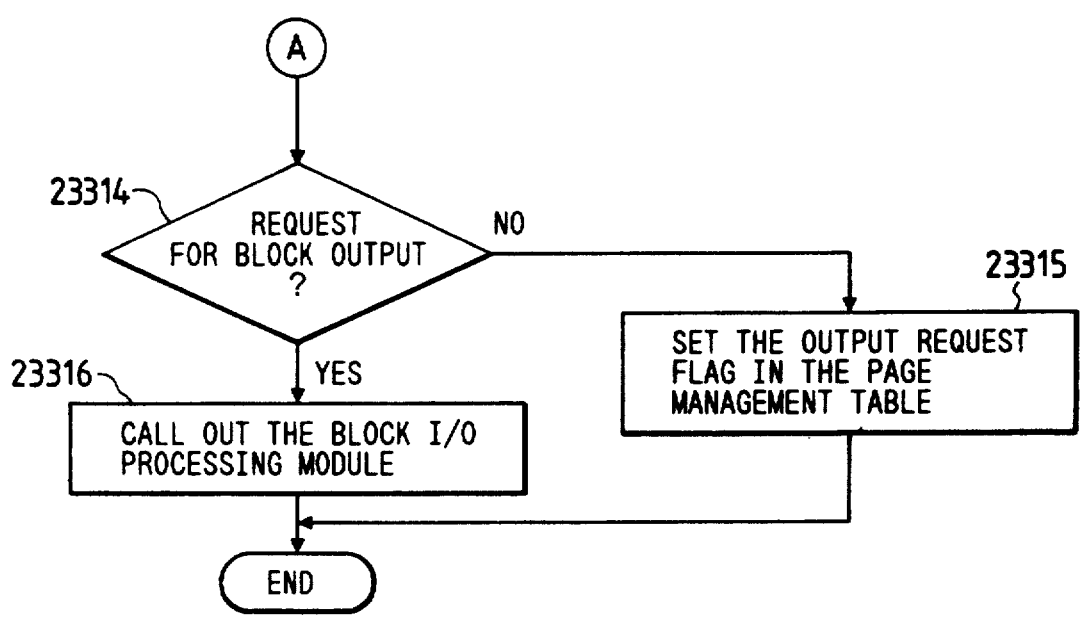
Figure 20C:
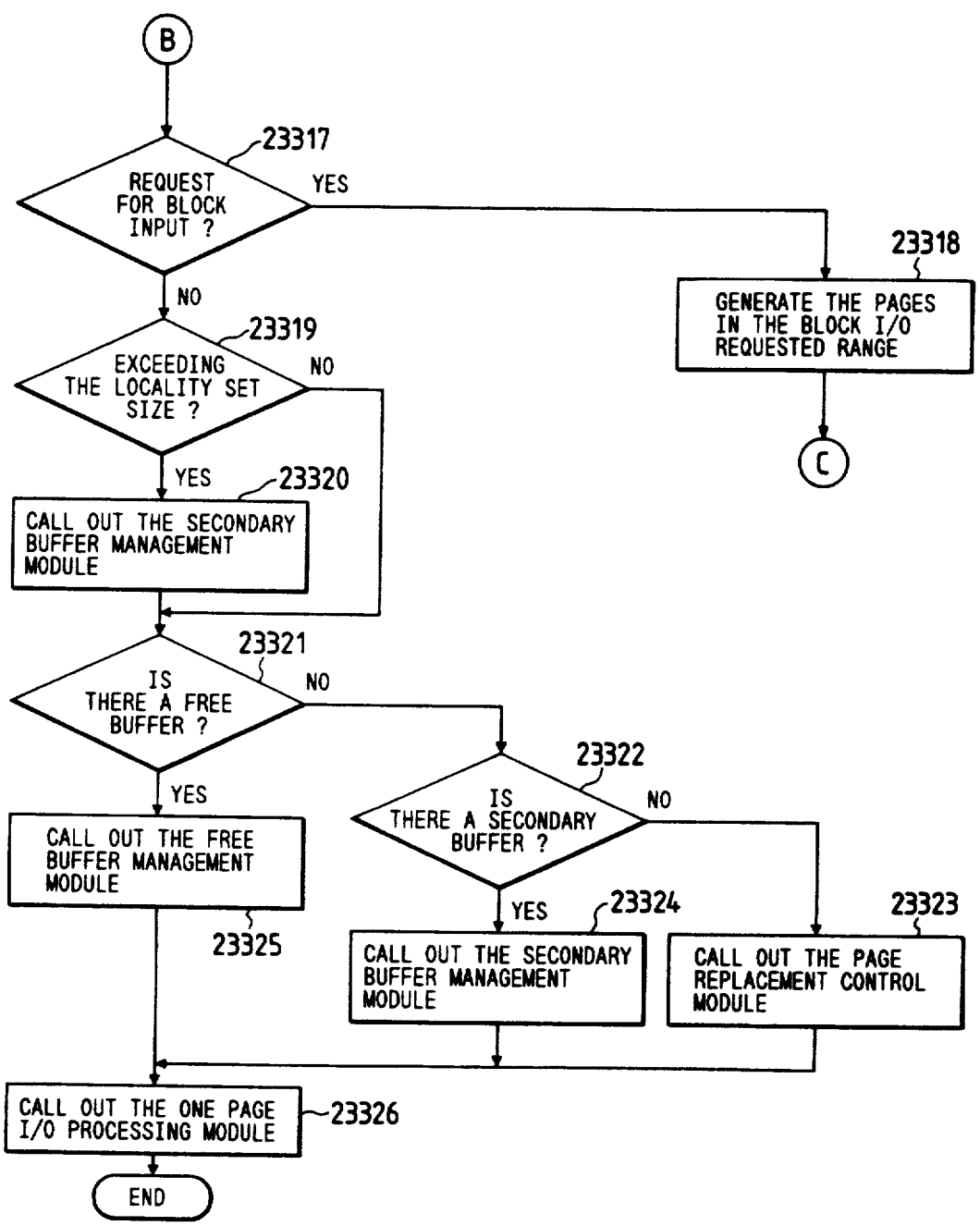

FIGS. 20(a), 20(b) and 20(c) are processing flow charts of the locality set management module of the present embodiment.

In case the request for the I/O buffer management module 53 is that for the page I/O processing, the locality set management module 533 operates. First of all, it is decided whether the page I/O processing request is an input request or an output request (at Step 23300). In the case of the input request, whether or not the processing is ended is decided for the page retrieval range by the input request so that the one-page input and the block input may be processed in a mixed manner (at Step 23301). If the retrieval range is in the end status, it is decided whether or not the request is the block input request (at Step 23302). If the request is the block input request, the control is transferred to the block I/O processing module 539 to execute the block input (at Step 23303). In case, on the other hand, the retrieval range is not in the end status in the locality set management module 533, the control is transferred to the buffer search processing module 536 for searching whether or not the requested page exists in the I/O buffer (at Step 23304).

Figure 27:
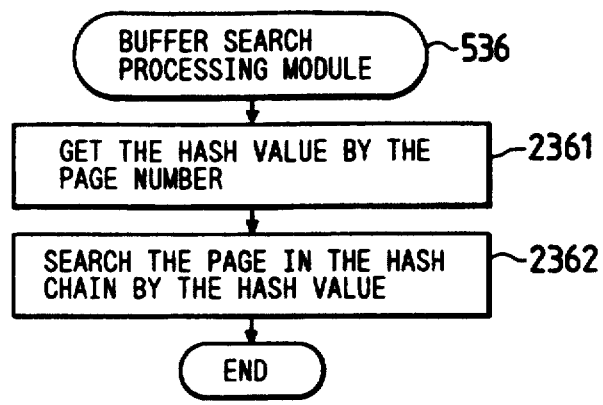
FIG. 27 is a processing flow chart of the buffer search processing module.

FIG. 27 is a processing flow chart of the buffer search processing module in the present embodiment.

The buffer search processing module 536 takes the hash value according to a certain hash function by the number of the requested page (at Step 2361). The page is searched by the got hash value from the chain of the buffer having said hash value (at Step 2362). As a result, the reference is reverted to FIG. 20(a), it is decided whether or not the page is absent (at Step 23305). In case the page is not absent, i.e., in case the page is found on the I/O buffer 68, it is decided whether or not the page found on the buffer is chained in the query locality set already requested by the page (at Step 23306). In case the page is chained in the requested locality set, the control is transferred to the page replacement control module 537 so as to replace the chain of the buffer in the locality set (at Step 23307). In case the page is not chained in the requested locality set, it is decided whether or not said page is chained in another locality set (at Step 23308). In case the page is chained in another locality set, the shared page management table 66 is chained to the requested locality set so that said page may be shared even by the requested locality set, to accomplish the page sharing control processing for chaining the shared page management table 66 in the page management table 65 of the shared page (at Step 23309).

In case the page is not chained in another locality set, i.e., in case the page exists on the secondary buffer, whether or not the locality set size is exceeded is decided in dependence upon whether or not the assigned buffer number in the requested locality set is equal to the locality set size (at Step 23310). In case the locality set is not exceeded, the control is transferred to the page replacement control unit 537 to connect said page to the locality set required from the secondary buffer (at Step 23311). After this, the number of buffers to be assigned in the locality set in the locality set management table of the required locality set is updated (at Step 23312). Then, the control is transferred to the secondary buffer management module 534 so that the page management table 65 of the page existing in the buffer is released from the chain of the secondary buffer (at Step 23313).

Next, reverting to the Step 23305, in case no page is found in the page absence decision, as shown in FIG. 20(c), it is decided at first whether said input request is the one-page input request or the block input request (at Step 23317). In the case of the block input request, the page range information for the block input from the external storage device 4 is generated (at Step 23318) so that the page searches are repeated till the end of the retrieval range (at Steps 23301, 23304 and 23305).

In the case of the one-page input request, on the other hand, whether or not the locality set size is exceeded is decided in dependence upon whether or not the assigned buffer number in the requested locality set size is equal to the locality set size (at Step 23319). In case the locality set size is exceeded, the control is transferred to the secondary buffer management module 534 so as to change the chain to the secondary buffer management module 534 by the replacement algorithm of said locality set (at Step 23320). After this or in case the locality set size is not exceeded, it is decided whether or not the free buffer exists (at Step 23321). In the absence of the free buffer, it is decided whether or not the secondary buffer exists (at Step 23322). In the presence of the secondary buffer, only one plane of the buffer is secured by the replacement algorithm of the secondary buffer. The control is transferred to the secondary buffer management module 534 (at Step 23324) so as to connect the secured buffer with said requester's locality set. In the presence of the free buffer, on the other hand, the control is transferred to the free buffer management module 535 so as to secure only a one-plane buffer from the free buffer chain thereby to connect the secured buffer to said requester's locality set (at Step 23325). In the case of the one-page input request, the control is transferred to one-page I/O processing unit 538 so as to input the page to the page input buffer from the external storage device 4 after all of the processings (at Step 23326).

Next, the output is requested in the decision in the processing of the locality set management module 533 of FIG. 20(a) upon whether or not the request for the locality set management module 533 is the output request. In this case, it is decided whether or not said output request is that for the block output (at Step 23314), as shown in FIG. 20(b). In case said output request is not the block one, i.e., in the case of the one-page output request, the output request flag is set on the page management table 65 (at Step 23315). In the case of the request for the block output, the control is transferred to the block I/O processing module 539 (at Step 23316) so that the page of the existence of all the output requests in the locality set may be written in group in the external storage device 4.

Figure 25:
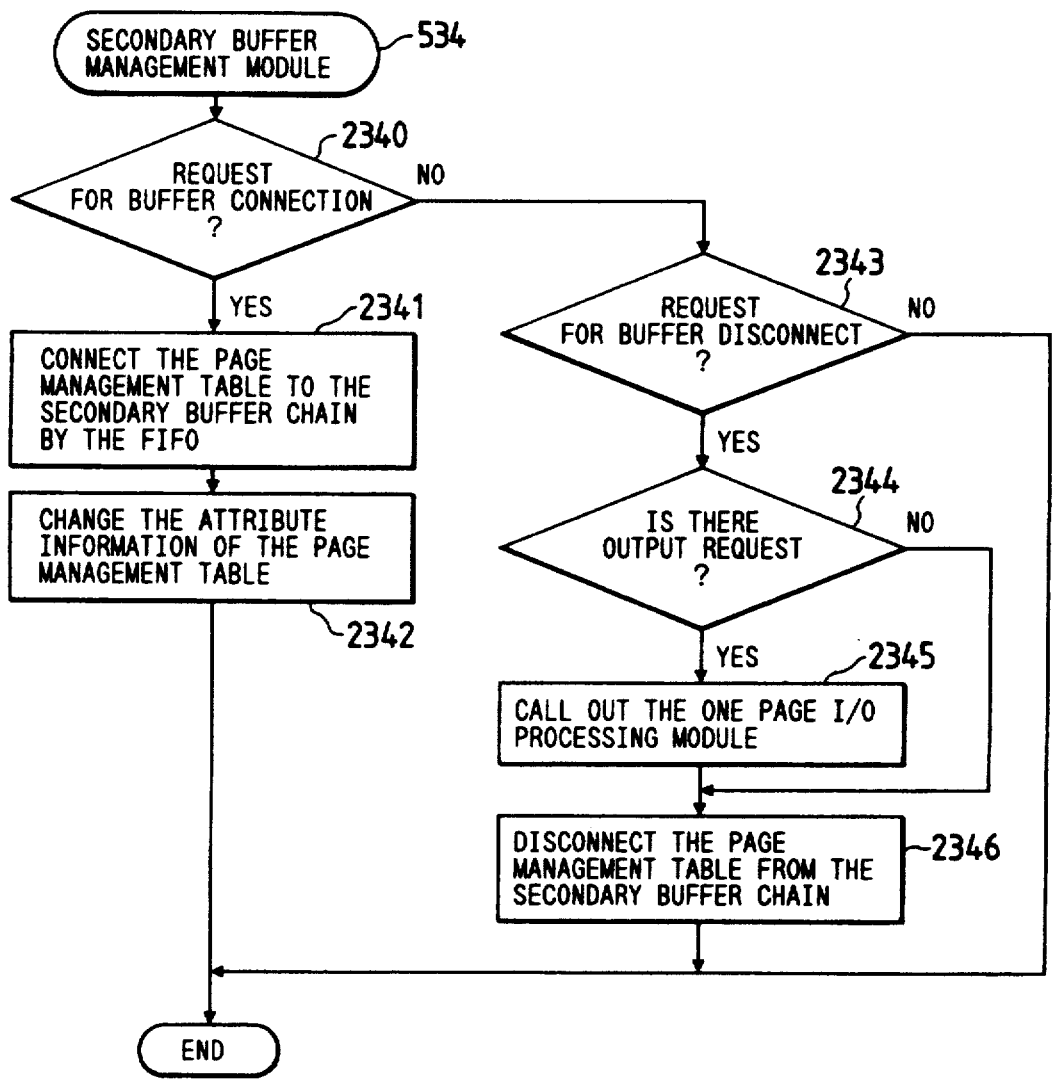
FIG. 25 is a processing flow chart of the secondary buffer management module.

FIG. 25 is a processing flow chart of the secondary buffer management module in the present embodiment.

In the secondary buffer management module 534, it is decided whether or not the request is for the buffer connection to the secondary buffer chain (at Step 2340). In case the request is for the connection, the page management table 65 requested is connected to the secondary buffer chain by the replacement algorithm FIFO of the secondary buffer (at Step 2341). If the connection is ended, the attribute information (e.g., the locality set ID) of the page management table 65 is changed (at Step 2342). In case, on the other hand, the request is not for the buffer connection to the secondary buffer chain, it is decided whether or not the request is for the buffer disconnection from the secondary buffer chain (at Step 2343). In the case of the request for the buffer disconnection, it is decided whether or not there is a request for the output to the external storage device 4 for the page of the buffer to be disconnected (at Step 2344). In the presence of the output request, the control is transferred to the one-page I/O processing module 538 for the output to the external storage device 4 (at Step 2345). Moreover, if the processing of the output request of said buffer is ended or in the absence of the output page request, the page management table 65 of said buffer is disconnected from the secondary buffer chain (at Step 2346).

Figure 26:
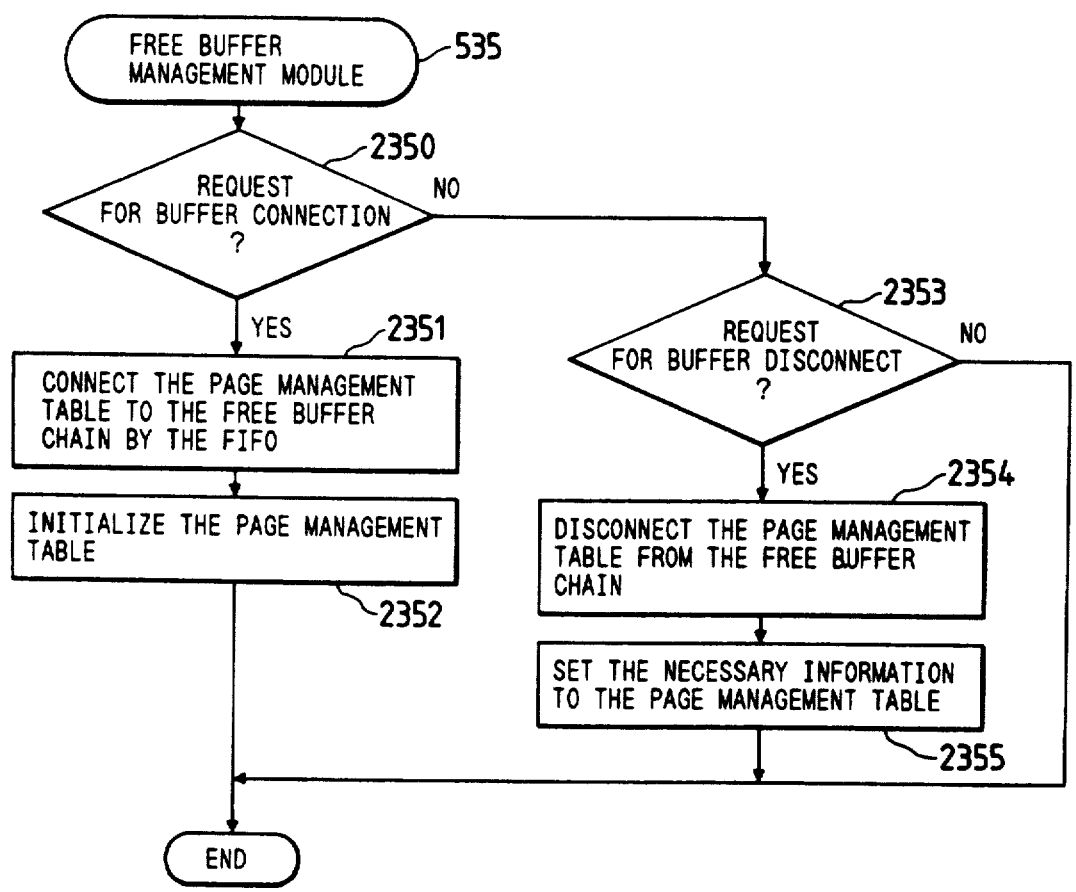
FIG. 26 is a processing flow chart showing the free buffer management module.

FIG. 26 is a processing flow chart of the free buffer management module in the present embodiment.

In the free buffer management module 535, it is decided at first whether or not the request is for the buffer connection to the free buffer chain (at Step 2350). In the case of the request for the connection, the page management table 65 required for the free buffer chain is connected by the replacement algorithm FIFO of the free buffer (at Step 2351). By this connection, the information such as the attribute information of said page management table 65 is initialized (at Step 2352). In the case out of the request for the buffer connection to the free buffer chain, on the other hand, it is decided whether or not the request for the buffer disconnection from the free buffer chain is (at Step 2353). In the case of the request for the buffer disconnection, the page management table 65 of the buffer to be disconnected is disconnected from the free buffer chain (at Step 2354). After this, the requester's information is set to the disconnected page management table 65 (at Step 2355).

Figure 28:
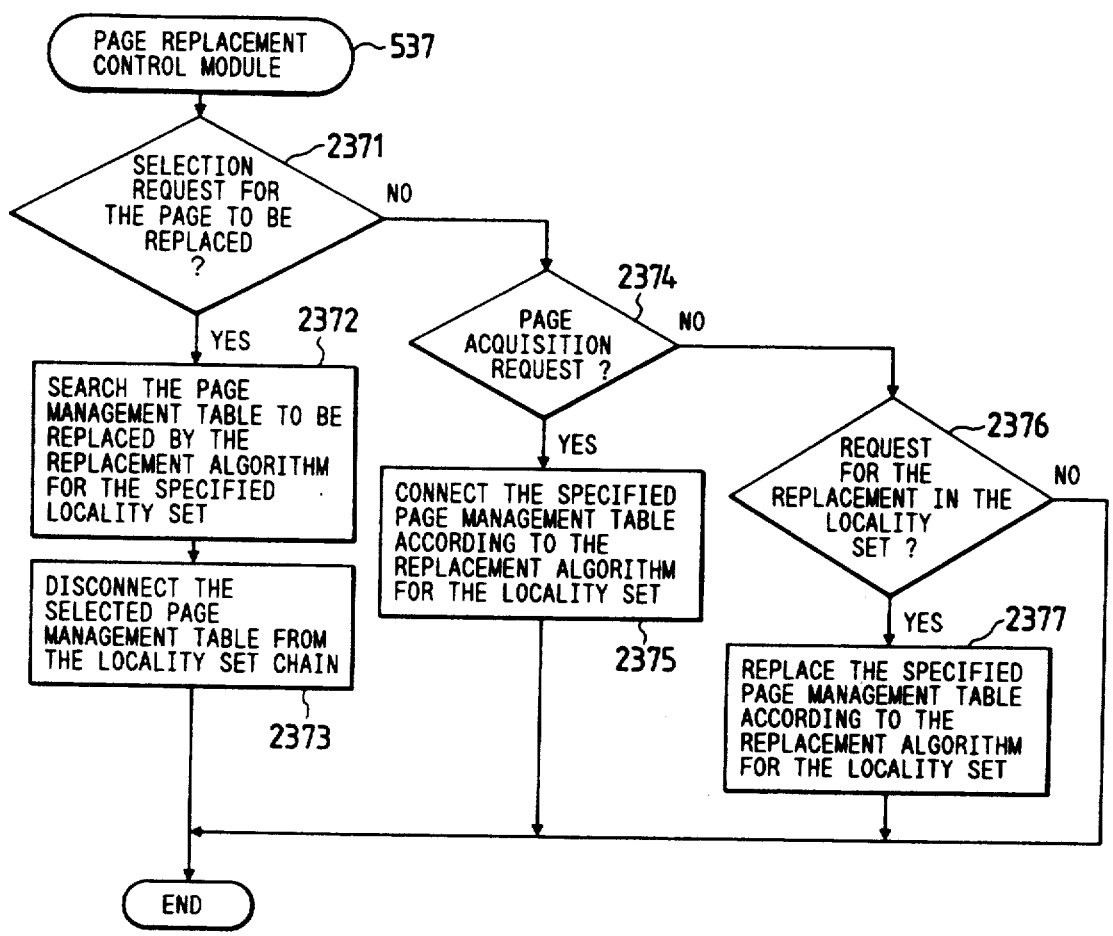
FIG. 28 is a processing flow chart of the page replacement control module.

FIG. 28 is a processing flow chart of the page replacement control module in the present embodiment.

In the page replacement control module 537, it is decided at first whether or not the request is a selection request for the page to be replaced from the locality set (at Step 2371). In case the request is the selection request, the page management table 65 of the page to be replaced by the replacement algorithm of said locality set is searched from the specified locality set (at Step 2372). Then, the selected page management table 65 is disconnected from the chain of the specified locality set (at Step 2373). In case the request is not the selection request, it is decided whether or not the request is the page acquisition request in the locality set (at Step 2374). In the case of the page acquisition request, the specified page management table 65 is connected according to the replacement algorithm for the specified locality set (at Step 2375). If the request is not the page acquisition request, on the other hand, it is decided whether or not the request is one for the replacement of the specified page in the locality set (at Step 2376). In the case of the request in the locality set replacement, the page management table 65 of the specified page has its chain replaced in accordance with the replacement algorithm of said locality set (at Step 2377).

Figure 29:
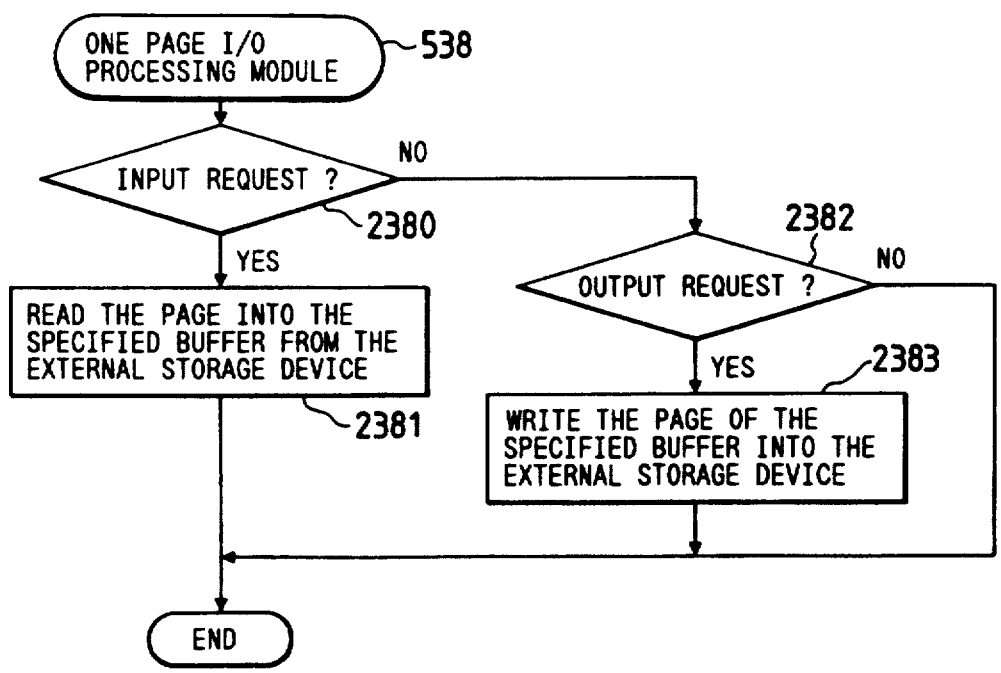
FIG. 29 is a processing flow chart showing the one-page I/O processing module.

FIG. 29 is a processing flow chart showing the one-page I/O processing module in the present embodiment.

In the one-page I/O processing module 538, it is decided whether or not the processing request is the input request (at Step 2380) or the output request (at Step 2382). In the case of the input request, the page is read into the specified buffer from the external storage device 4 (at Step 2381). In the case of the output request, the page of the specified buffer is written into the external storage device 4 (at Step 2383).

Figure 30:
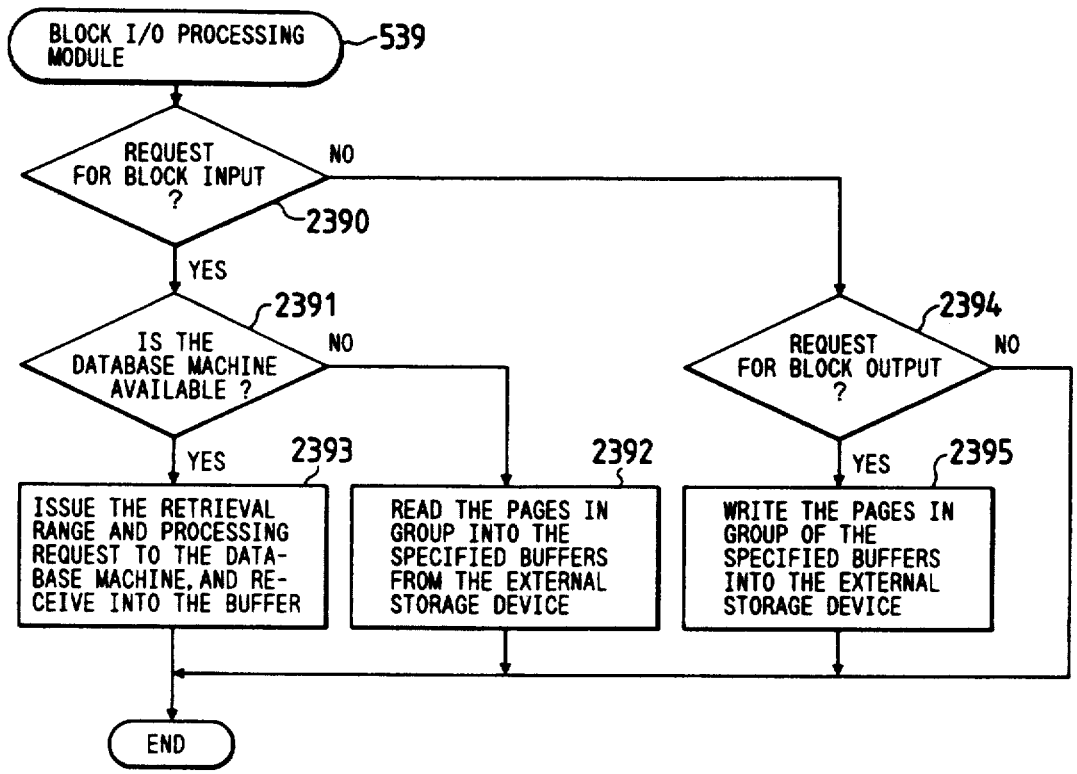
FIG. 30 is a processing flow chart showing the block I/O processing module.

FIG. 30 is a processing flow chart showing the block I/O processing module in the present embodiment.

In the block I/O processing module 539, it is decided at first whether the processing request is the block input request (at Step 2390) or the block output request (at Step 2394). In the case of the block input request, it is decided whether or not the database machine is to be utilized (at Step 2391). In case the database machine is not used, the page group in the block input request page range information (at Step 23318), which has been prepared by the processings shown in FIG. 20(c), into the specified I/O buffer group from the external storage device 4 (at Step 2392). In case, on the other hand, the database retrieval is to be executed by utilizing the database machine, the retrieval range informations and the database processing request are issued to the database machine, and the database processing result is received at the specified I/O buffer group (at Step 2393).

In the case of the block output request, on the other hand, the pages of the specified I/O buffer group are written in block into the external storage device 4 (at Step 2395).

By these procedures, the one-page I/O processing and the block I/O processing can be mixed for the I/O processings in the I/O buffer management module 53.

Figure 31:
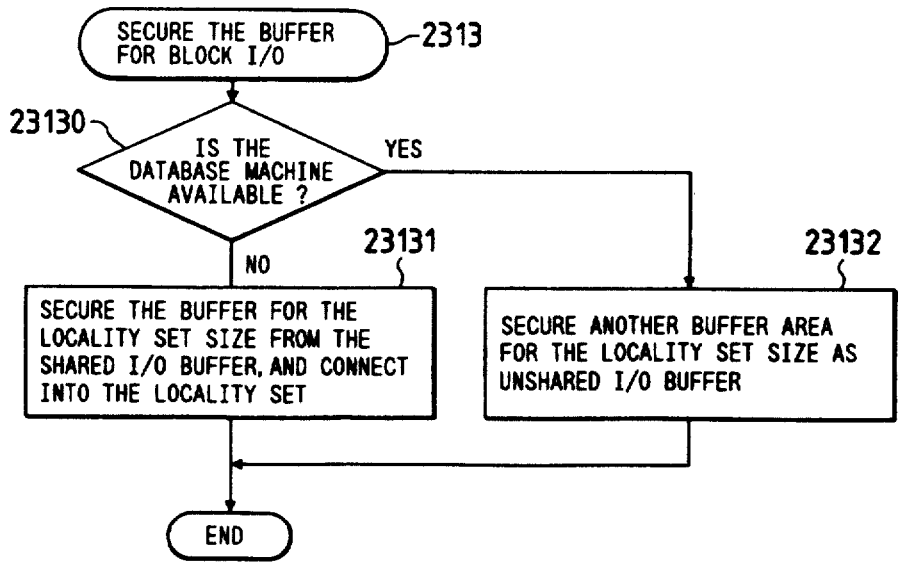
FIG. 31 is a flow chart showing the block I/O buffer securing processing of the locality set securing processing module.
Figure 32:
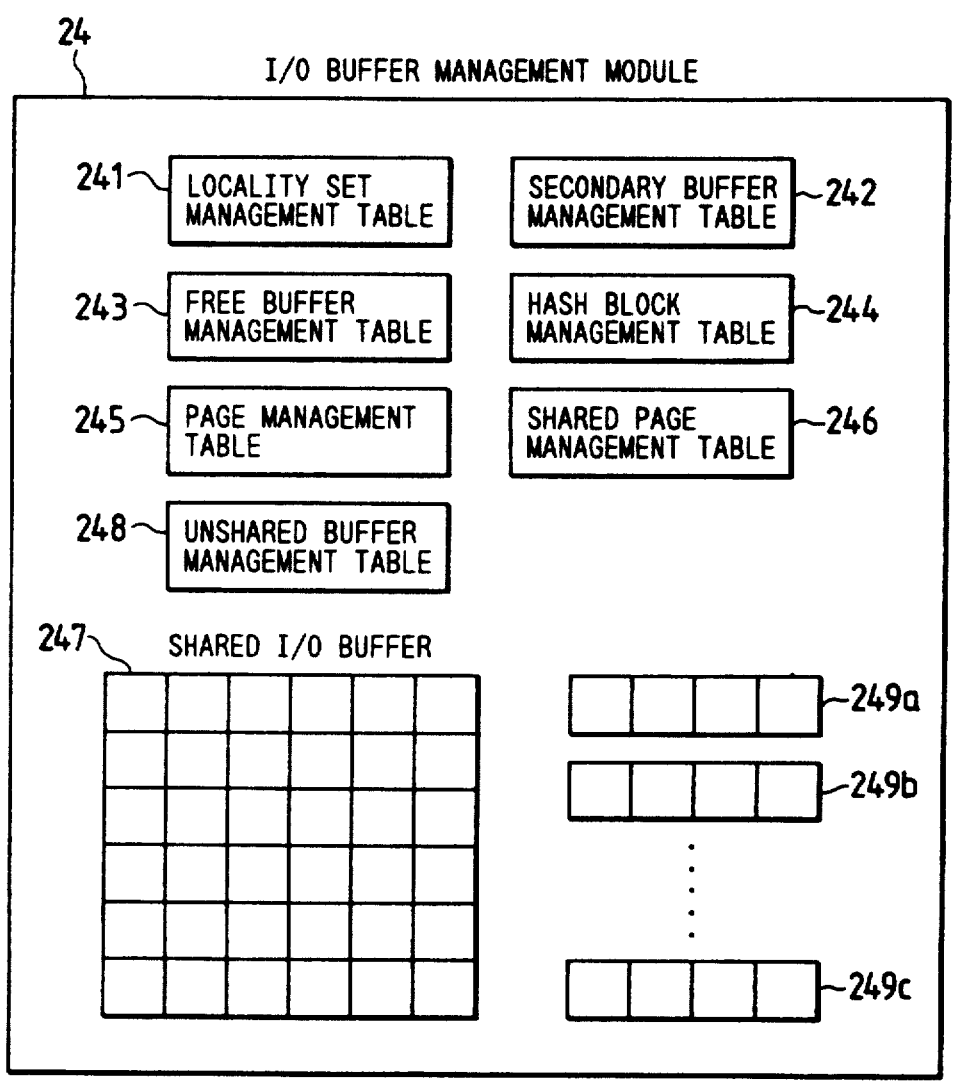
FIG. 32 is a block diagram showing the functions of the I/O buffer management modules according to a modification of the present embodiment.

FIG. 31 is a flow chart showing one example of the block I/O buffer securement in FIG. 7. FIG. 32 is a block diagram showing the functions of another embodiment of the I/O buffer management module of FIG. 5.

In FIG. 32: reference numeral 24 designates an I/O buffer management module; numeral 241 designates a locality set management table; numeral 242 designates a secondary buffer management table; numeral 243 designates a free buffer management table; numeral 244 designates a hash block management table; numeral 245 designates a free buffer management table; numeral 246 designates a hash block management table; numeral 248 designates an unshared buffer management table; numeral 247 designates a shared I/O buffer; and characters 249a, 249b, - - - , and so on designate unshared I/O buffers.

In the locality set securing processing module 531 of FIG. 31, in the block I/O buffer securement (at the Step 5313), it is decided whether or not the database machine is to be applied to the block input request of the block I/O request (at Step 23130). In case the database machine is not applied, the buffer is secured from the shared I/O buffer 247 of the I/O buffer management module 24 shown in FIG. 32, and the page management table of the secured buffer is chained into the locality set (at Step 23131). In case the database machine is applied, on the other hand, the result of the database operation by the database machine is not shared by another user. Thus, an unused one of the unshared I/O buffers 249a, 249b, 249c, - - - , and so on of the I/O buffer management module 24 shown in FIG. 32 is secured (at Step 23232). These unshared I/O buffers 249a, 249b and 249c are managed by the unshared buffer management table 248 and provide a continuous area on the virtual memory corresponding to the locality set size so that they need not be managed at the unit of the pages nor receive any interference against the buffers from another user.

FIG. 33 is a processing flow chart showing another embodiment of the block I/O processing of FIG. 30.

FIG. 33 shows the processings, in which the database machine cannot be used because of its trouble for the processing of the block I/O processing module 539 of FIG. 30 in the case of the block input request and in the application of the database machine.

First of all, in case the processing request for the block I/O processing module 539 is the block input request (at the Step 2390), it is decided whether or not the database machine is to be applied to the block input request (at the Step 2391). In case the database machine is not applied, the pages are inputted in block into the specified buffer group from the external storage device 4 (at Step 2392). In case, on the other hand, the database machine is applied for the block input request, it is decided whether or not the database machine is in an available status at present (at Step 2396). When the database machine can be used, the retrieval range and the database processing request are issued to the database machine, and the database processing result is received by the specified buffer group (at Step 2393). After this, it is decided whether or not the database machine has been troubled or ended normally as a result of the operation by the database machine (at Step 2397). If it is detected that the database machine has been troubled, the database machine is brought into an unavailable status (at Step 2398). Next, it is decided whether or not the database machine is in the available status (at the Step 2396). In the case of the unavailable status, the application of the database machine is stopped, and the pages are read in block into the specified buffer group from the external storage device 4 (at the Step 2392). Thus, the query processings can be continued by replacing the input processing even if the database machine is in the unavailable status.

Thus, in the present invention, (a) the I/O buffer having stored the saved data can be used by saving the data partially in the I/O buffers on the expanded memory even if the I/O buffers on the virtual space become short. As a result, the standby for the processing due to the shortage of the I/O buffers can be eliminated. Since, moreover, the data are saved in the expanded memory, they may be restored from the expanded memory to the I/O buffers on the virtual space in case the data on the expanded memory are to be referred to. As a result, the I/O processings for the external storage device can be reduced. Since, moreover, the time period required for saving and restoring the data on the main memory for the expanded memory is far shorter than the access time to the external storage device, it is possible to improve the performances of the database management system.

(b) If, moreover, the data of some of the I/O buffers on the virtual space are updated, the status is that an output request is made for the external storage device. At the same time, the pages are fixed in the main memory by the replacement algorithm of the I/O buffers till the output to the external storage device. As a result, the I/O processings by the page-out and page-in can be reduced by the paging management of the operating system. In case, on the other hand, a plurality of pages are pre-read for the I/O buffer, the buffer group is page-fixed in advance on the main memory. As a result, the data are not subjected to the paging management of the operating system till the end of the database processings of all the pages, so that any excess I/O processings can be reduced.

By saving the data inputted from the database on the external storage device into the expanded memory, moreover, the input processings from the external storage device for the data input request from the I/O buffer management module can be minimized, as necessary, so that the inputting time period can be accordingly shortened.

(c) In case, moreover, the database query requests sequentially execute all the retrievals, the buffer secured in advance sequentially writes and reads because it is given the I/O buffer management function to execute the block input processing matching said database reference characteristics. Thus, the using efficiency of the I/O buffers for another query request is little influenced so that the page absences can be reduced. In case the database machine can be applied, on the other hand, the I/O buffers are divided into the shared and unshared buffers so that the operation results by the database machine are received by the unshared buffers, thus preventing the share of the pages in the shared buffers from being reduced.

(d) In case, moreover, the database query requests update mass data sequentially, the secondary buffer is used after the block writing in the external storage device, if the number of the output request buffers in the locality set becomes equal to the locality set size. Thus, in case the query for another reference is encountered by the page absence, the buffers issuing the output request in the secondary buffer can be less selected to reduce the unnecessary I/O processings.

(e) In case, moreover, the access is performed by applying the database machine in the block input processing, the database machine is brought into the unavailable status if it is detected that the database machine had been troubled. After this, the request for applying the database machine can be replaced by the block input processing applying no database machine, to continue the processings without any interruption.

As has been described hereinbefore, according to the present invention: (i) the data of the I/O buffers on the virtual memory are saved in the I/O buffers on the expanded memory in accordance with an object. As a result, the I/O processings of the external storage memory can be reduced to utilize the I/O buffers efficiently. (ii) In case a reservation of the output request or the input request to the external storage device issues the pre-read processing request at the unit of plural pages, the I/O buffers can be efficiently utilized by fixing the pages on the main memory. (iii) By arranging the database on the external storage device on the expanded memory, too, it is possible to reduce the I/O processings of the external storage device and to shorten the I/O processing time of the I/O buffer management. (iv) When the pre-read in the buffers or the block write in the external storage device is to be executed, the I/O time period can be reduced to utilize the I/O buffers efficiently by determining the operating unit. (v) In case, moreover, the database machine is troubled, too, the I/O buffers can be efficiently utilized by making a switching to the stop of the retrieval request or the I/O of the I/O operations of plural or one page.

What is claimed is:

1. A method of managing an I/O buffer on a main memory, which is managed by a database management system and secured on a virtual memory space of a virtual memory system, comprising:

a step of receiving an input request of a plurality of data pages from an external storage device in response to a query;

a step of fixing the area of said I/O buffer on said virtual memory in one to one correspondence, to said main memory in accordance with management tables which store location information, each management table being defined in the virtual memory area of said I/O buffer corresponding to one of the data pages of said I/O buffer, management information concerning the content of the database being stored in said I/O buffer, and a page fixing flag indicating that said I/O buffer on said virtual memory is fixed onto said main memory, in one to one correspondence, to isolate the fixed area from virtual memory area for other programs; and a step of setting on the page fixing flag of said management table of each I/O buffer.

2. A buffer management method according to claim 1, further comprising:

a step of processing a database operation for each of the data pages, which are inputted to the I/O buffer fixed on said main memory;

a step of releasing the fixing of said data pages on said main memory for the I/O buffer when said database operation is ended; and a step of setting off of the page fixing flag of the management table of said I/O buffer.

3. A buffer management method according to claim 2, wherein the step of fixing the area of said I/O buffer on said main memory and the step of setting on said management table page fixing flag of each I/O buffer are performed by an I/O buffer management program module.

* * * * *